United States Patent [19]

Uesaka et al.

[11] Patent Number: 5,011,879

[45] Date of Patent: Apr. 30, 1991

[54] ENGINEERING PLASTIC COMPOSITION AND AN ARTICLE MADE OF THE SAME

[75] Inventors: Toshio Uesaka, Kyoto; Akihiro Niki; Makoto Ohsuga; Toranosuke Saito; Hiroki Tsunomachi; Makoto Yamaguchi; Kazuo Doyama; Daishiro Kishimoto, all of Osaka, Japan

[73] Assignees: Sekisui Kagaku Kogyo Kabushiki Kaisha; Kabushiki Kaisha Sanko Kaihatsu Kagaku Kenkyusho, both of Osaka, Japan

[21] Appl. No.: 356,725

[22] Filed: May 25, 1989

[30] Foreign Application Priority Data

| May 26, 1988 | [JP] | Japan | 63-129174 |
| May 26, 1988 | [JP] | Japan | 63-129175 |
| May 26, 1988 | [JP] | Japan | 63-129176 |
| May 26, 1988 | [JP] | Japan | 63-129177 |
| Aug. 31, 1988 | [JP] | Japan | 63-216873 |
| Aug. 31, 1988 | [JP] | Japan | 63-216875 |
| Nov. 30, 1988 | [JP] | Japan | 63-304605 |
| Nov. 30, 1988 | [JP] | Japan | 63-304606 |
| Nov. 30, 1988 | [JP] | Japan | 63-304607 |
| Nov. 30, 1988 | [JP] | Japan | 63-304608 |
| Jan. 25, 1989 | [JP] | Japan | 1-15682 |

[51] Int. Cl.$^5$ .......................... C08K 5/10; C08K 5/06; C08K 5/05; C08K 5/01

[52] U.S. Cl. .................... 524/290; 524/291; 524/299; 524/369; 524/486

[58] Field of Search ............. 524/290, 291, 299, 369, 524/486

[56] References Cited

U.S. PATENT DOCUMENTS 4,760,109 7/1988 Chiba .............................. 524/606

OTHER PUBLICATIONS

Def. Pub. No. T926,008, published Sep. 3, 1974.
Chemical Abstracts, vol. 67, No. 12, 1967, page 5172, abstract no. 54802q.

Primary Examiner—Lewis T. Jacobs
Attorney, Agent, or Firm—Armstrong, Nikaido, Marmelstein, Kubovcik & Murray

[57] ABSTRACT

An engineering plastic composition with excellent flowability, heat stability, and desirable mechanical properties is provided. The composition comprises an engineering plastic material and at least one p-quaterphenyl derivative of specific formula.

10 Claims, No Drawings

ENGINEERING PLASTIC COMPOSITION AND AN ARTICLE MADE OF THE SAME

BACKGROUND OF THE INVENTION

1. Field of the Invention

This invention relates to an engineering plastic composition with excellent flowability, heat stability, and desirable mechanical properties, and to articles made of the same.

2. Description of the Prior Art

Many resins are known as engineering plastic materials. They include polyetherimide, polyarylketone, polysulfone, polyarylenesulfide, polyarylate, liquid crystal polyester, polyamide-imide, polycarbonate, polyphenyleneoxide, etc. These engineering plastic materials can be used in various kinds of articles that require a high-performance material with qualities such as excellent heat stability and mechanical properties. However, in general, the melt viscosities of engineering plastic materials are high, and as a result, the workability of the materials is poor. Therefore, it is not easy to use these engineering plastic materials for products to be formed with accuracy. For these reasons, there is a need for an engineering plastic composition that has a low melt viscosity, that is, satisfactory flowability, during molding.

In general, as methods by which the melt viscosity of polymers can be lowered, the following two methods have been adopted: (1) to decrease the molecular weight of the polymer, and (2) to add a plasticizer or to add a processing aid.

When the first method is used, the tensile strength, the impact strength, and other mechanical properties of the articles that are made of the polymer are worsened, and the heat stability of the articles declines. In the second method, many of the substances that can provide engineering plastic materials with plasticity have poor heat stability, so that these substances are not stable at the molding temperature for the engineering plastic materials. For these reasons, a plasticizer or processing aid that is effective with engineering plastic materials has not yet been found.

Many attempts have been made to improve the moldability or workability of engineering plastic materials. The conventional methods for the improvement of the engineering plastic materials listed above will be described below in detail.

(a) Polyetherimide

In order to improve the moldability of polyetherimide, methods that involve the blending of polyetherimide with other thermoplastic resins have been proposed. For example, there are methods in which polyarylether with a low molecular weight is included in a blend (Japanese Laid-Open Patent Publication No. 59-12967), in which polyalkyl lactone with a molecular weight within specified limits is included in a blend (Japanese Laid-Open Patent Publication No. 60-156754), and in which a block copolymer made of vinyl aromatic compounds and diene compounds is included in a blend (Japanese Laid-Open Patent Publication No. 60-156753). However, compared to the heat stability of polyetherimide, the heat stability of all of these thermoplastic resins is low. Therefore, in these methods, the heat stability of polyetherimide compound is decreased.

(b) Polyarylketone

A method has been proposed in which the moldability of polyarylketone are improved by its being blended with polyphenylenesulfide (Japanese Laid-Open Patent Publication No. 57-172954). In this method, in order that the moldability will be improved sufficiently, it is necessary to include a large amount (tens of percents by weight based on the total weight of the resin) of polyphenylenesulfide in the blend. For this reason, the excellent mechanical properties of polyarylketone decline.

(c) Polysulfone

A method has been proposed in which a thermoplastic resin other than polysulfone is blended with polysulfone in order to improve its flowability. For example, there are the method in which polyurethane is blended with polysulfone (Japanese Laid-Open Patent Publication No. 50-144750), the method in which poly-(alkylene-phenylene)ester or poly(alkylene-phenylene)ether is blended with polysulfone (Japanese Laid-Open Patent Publication No. 50-146648), the method in which a copolymer of an aromatic vinyl monomer and maleimide monomer is blended with polysulfone (Japanese Laid-Open Patent Publication No. 61-66750), and the method in which copolymer of acrylonitrile, butadiene, and styrene is blended with polysulfone (Japanese Laid-Open Patent Publication No. 56-167752). The heat stability of all of the thermoplastic resins used in the above methods is inferior to that of polysulfone. For that reason, the excellent heat stability of the polysulfone is decreased by their use.

(d) Polyarylenesulfide

Methods have been proposed in which solid polyethylene is added to polyarylenesulfide (Japanese Laid-Open Patent Publication No. 54-47752) and in which a block copolymer of hydrogenated conjugated dienes and aromatic compounds with one vinyl group is added to polyarylenesulfide (Japanese Laid-Open Patent Publication No. 59-217760). However, with these techniques, because the heat stability of the polymers used is inferior to that of the polyarylenesulfide, the superior heat stability of the polyarylenesulfide is decreased.

(e) Polyarylate

When polyarylate is prepared by polymerization, an agent for regulating the molecular weight is added, said agent being a monohydric aliphatic alcohol or an aliphatic monocarboxylic acid, and accordingly it is possible to obtain polyarylate with a comparatively low molecular weight. This method has been proposed (Japanese Patent Publication No. 57-49046); other methods that have been proposed include a method in which a branching agent such as alcohol that has three or more hydroxyl groups is used (Japanese Patent Publication No. 61-26567). However, in such methods, the excellent mechanical and other properties of the polyarylate are worsened.

(f) Liquid Crystal Polyester

A method has been proposed in which a small amount of a liquid crystal compound of low molecular weight is blended with liquid crystal polyester (Japanese Laid-Open Patent Publication No. 59-85733). However, because the liquid-crystal transition temperature of liquid crystal compounds of low molecular weight is relatively low, the heat stability of the liquid crystal polyester is decreased.

(g) Polyamide-imide

The method has been proposed in which an aromatic aminocarboxylic acid or its derivative or else an aromatic diamine with one of its amino groups masked is added as an agent to regulate the molecular weight when polyamide-imide is polycondensed (Japanese Laid-Open Patent Publication No. 61-44928). However, although the moldability and workability of the polyamide-imide obtained by this method are good, the density of cross-linking caused by the reaction that takes place in the polyamide-imide during the time of post-curing is decreased, so that the excellent qualities of polyamide-imide cannot be maintained.

(h) Polycarbonate

The glass transition temperature of polycarbonate is high (140°-150° C.), and its mechanical properties, dimensional stability and transparency are extremely good. Because of its mechanical properties, heat stability and other qualities, polycarbonate is suitable for use in machine parts, electrical parts, optical parts, and other products in which high performance is needed.

This resin has heat stability, mechanical properties, and water absorbance superior to those of other transparent materials such as polymethylmethacrylate. However, because its melt viscosity is high, the molecules of the resin come to be oriented in the direction of the flow of the resin when a product is being molded, so that double refraction readily arises in the product obtained. Therefore, it is difficult, for example, to use polycarbonate in the manufacture of a transparent substrate for precision optical systems in which information is recorded and reproduced by the radiation of a laser beam on the substrate. When polycarbonate is used as a resin in machine parts or electrical parts, in order to increase the mechanical properties of the part, glass fibers are added to the polycarbonate. The addition of glass fibers to a polycarbonate composition further worsens the flowability; and high temperatures are needed in molding (300°-360° C.). If this composition is heated to 350° C. or more, the product may be discolored.

A number of methods have been suggested to obtain a resin composition that confers low degree of double refraction by the improvement of the flowability at the time of molding of the polycarbonate. For example, there is a method in which a styrene-type copolymer is mixed with polycarbonate (Japanese Laid-Open Patent Publication Nos. 63-90556 and 63-90557), and a method in which polylactone and a styrene-type polymer are mixed with polycarbonate (Japanese Laid-Open Publication No. 63-90555). Also, methods have been suggested that involve the addition of an agent to regulate the molecular weight at the time of the preparation of the polycarbonate (Japanese Laid-Open Patent Publication Nos. 61-123625 and 63-43925). As the agent for the regulation of molecular weight, phenol with one specific aliphatic chain can be used. However, with all of these methods, the excellent heat stability and mechanical properties of the polycarbonate are greatly decreased.

A method has been proposed in which an ester of aromatic carboxylic acid is added to polycarbonate (Japanese Patent Publication No. 58-13586) and another method has been proposed in which organic carbonate is added (Japanese Patent Publication No. 60-34584). However, these compounds that may function as a plasticizer or processing aid for polycarbonate are not stable at the high molding temperatures of 260°-320° C.

(i) Polyphenylene Oxide

A mixture of polyphenylene oxide and polystyrene and a mixture of polyphenylene oxide and nylon are commercially available. However, in a composition of polyphenylene oxide that contains a large amount of polystyrene or nylon, the moldability is improved but the heat stability is decreased. When glass fibers are added to these blends, the heat stability and mechanical properties of the mixtures obtained are excellent, but the flowability is poor and the moldability declines.

Other methods have also been proposed. For example, there is a method in which a copolymer of a vinyl aromatic compound and an unsaturated dicarboxylic anhydride is blended with polyphenylene oxide (Japanese Laid-Open Patent Publication No. 58-42648); there is another method in which polyalkylene glycol is blended with polyphenylene oxide (Japanese Laid-Open Patent Publication No. 59-20354). In these methods also, however, the mechanical properties and heat stability of the polyphenylene oxide are worsened.

The p-quaterphenyl derivatives used in this invention have been known for many years. For example, methods for preparing these p-quaterphenyl derivatives are described in *Journal of the Chemical Society* 1379-85 (1940); in *Synthesis* 537-538 (1978); and in Japanese Laid-Open Patent Publication No. 61-293932. However, the p-quaterphenyl derivatives have high melting point and rigidity, so that there are very few cases in which p-quaterphenyl derivatives are used as additives for plastic materials. As one of the very few examples, Soviet Patent No. 186124 (10.14,1966) discloses the use of 4,4'''-dihydroxy-p-quaterphenyl as an agent for prevention of coloration in the preparation of polyamide by condensation polymerization.

SUMMARY OF THE INVENTION

An engineering plastic composition, which overcomes the above-discussed and numerous other disadvantages and deficiencies of the prior art, comprises an engineering plastic material and at least one p-quaterphenyl derivative selected from the group consisting of the compounds of formula I, II, and III:

(I)

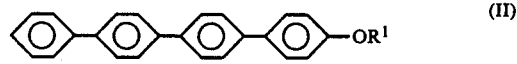
(II)

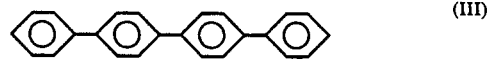
(III)

wherein $R^1$ and $R^2$, independently, are —H, —COCH$_3$, —CH$_2$CH$_2$OH, —CH$_2$CH$_2$OCOCH$_3$, —CH$_2$CH(CH$_3$)OH, —CH$_2$CH(CH$_3$)OCOCH$_3$, or alkyl containing from 1 to 15 carbon atoms, wherein said p-quaterphenyl derivative is present in an amount of from 0.1 to 15 parts by weight for each 100 parts by weight of said engineering plastic material.

In a preferred embodiment, the p-quaterphenyl derivative is present in an amount of from 0.5 to 12 parts by weight for each 100 parts by weight of the engineering plastic material.

In a preferred embodiment, the composition further comprises reinforcing fibers, wherein the reinforcing fibers are present in an amount of 0.1 to 400 parts by weight for each 100 parts by weight of the engineering plastic material.

In a preferred embodiment, the reinforcing fiber is present in an amount of from 5 to 200 parts by weight for each 100 parts by weight of the engineering plastic material.

This invention also includes an article obtained from the engineering plastic composition mentioned above.

Thus, the invention described herein makes possible the objectives of: (1) providing an engineering plastic composition that has excellent moldability because of its low melt viscosity, excellent heat stability, and superior mechanical properties that originate from the said engineering plastic material contained therein; (2) providing an engineering plastic composition that can be used in electronic products, film, sheets, pipes, and the like, in which high heat stability and superior mechanical properties are needed, and in paints, adhesives, fibers, and the like in which high heat stability is needed; (3) providing an engineering plastic composition that has excellent flowability even when it contains reinforcing fibers, so that the moldability are satisfactory, and also has the excellent qualities described in (1) and (2) above; (4) providing an engineering plastic composition that confers a very low degree of double refraction on the products that it is used to form (polycarbonate products, in particular) because the orientation of resin molecules at the time of formation is extremely small; and (5) providing an article obtained from the above-mentioned engineering plastic composition, which have superior heat stability and mechanical properties.

DESCRIPTION OF THE PREFERRED EMBODIMENTS

This invention is accomplished by the knowledge of the inventors that the melt viscosity of engineering plastic materials is significantly decreased when a p-quaterphenyl derivative is added thereto.

Engineering plastic materials that can be used in this invention include polyetherimide, polyarylketone, polysulfone, polyarylenesulfide, polyarylate, liquid crystal polyester, polyamide-imide, polycarbonate, polyphenyleneoxide, etc.

The polyetherimide mentioned above is a polymer that has essentially ether-bonds and imide bonds. The polymer with a repeating unit of formula IV as the major component is preferred:

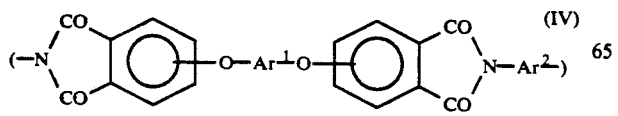

wherein $Ar^1$ is a divalent aromatic group that contains at least one six-membered carbon ring, such as, for example,

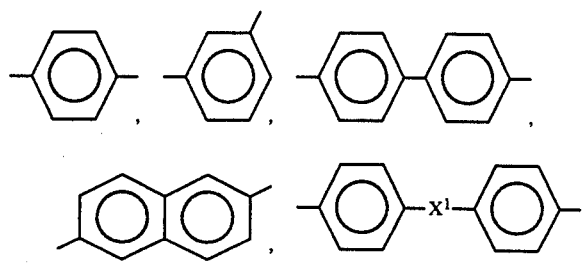

wherein $X^1$ is —O—, —S—, —CO—, —SO$_2$——SO—, or alkylene that contains 1 to 5 carbon atoms.

$Ar^2$ is a divalent aromatic group, such as, for example,

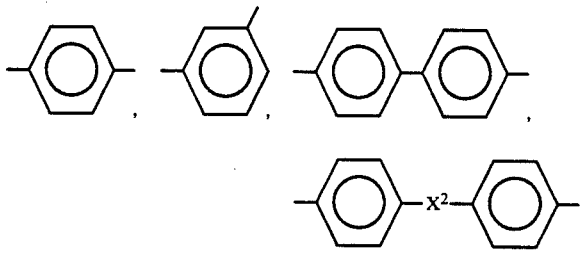

wherein $X^2$ is —O—, —S—, —CO—, —SO$_2$——SO—, or alkylene that contains 1 to 5 carbon atoms.

In this invention, the polyetherimide with a repeating unit of the following formula as the main component is particularly preferred, for example, ULTEM$^R$, available from GE Corp.

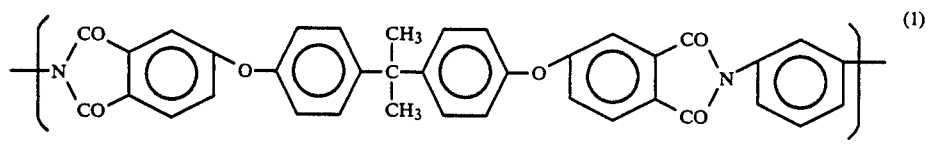

As the polyarylketone mentioned above, a polymer with a repeating unit of formula V as the main component is preferred:

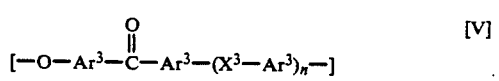

wherein the $Ar^3$ groups, independently, are divalent aromatic groups with at least one six-membered carbon ring such as, for example,

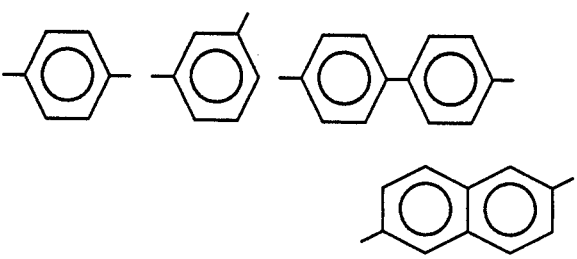

or the like. $X^3$ are, independently, —O—, —CO—, or a direct bond, and n is an integer from 0 to 3.

In this invention, polyarylketone that has the repeating unit V-I and polyarylketone that has the repeating unit V-II are particularly preferred:

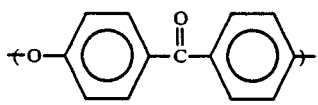

(V-I)

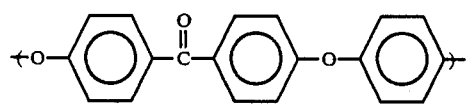

(V-II)

Examples of polymers with the repeating unit of formula V-I include VICTREX PEEK® available from ICI Corp. Examples of polymers with the repeating unit of the formula V-II include ULTRAPEK® available from BASF Corp.

As the polysulfone that can be used in the present invention, a polysulfone with a repeating unit of formula VI or VII is particularly suitable.

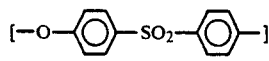

(VI)

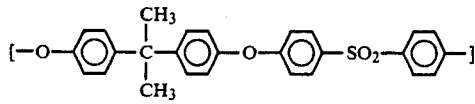

(VII)

Examples of polysulfones of formula VI include VICTREX PES®, available from ICI Corp., and examples of polysulfones of formula VII include UDEL®, available from UCC Corp.

As the polyarylenesulfide that can be used in the present invention includes polyphenylenesulfide, poly4,4'-diphenylenesulfide, poly-2,4-tolylenesulfide, a copolymer synthesized by a reaction of p-dichlorobenzene and 2,4-dichlorotoluene with sodium sulfide, etc. Polyphenylenesulfide with a repeating unit of the following formula as the main component is particularly preferred:

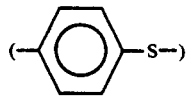

These polyphenylenesulfides include RYTON® available from Phillips Oil Corp., FORTRON® available from Kureha Kagaku Corp., SUPCE® available from GE Corp., TORPREN® available from Torpren Corp., etc.

As the polyarylate that can be used in the present invention, a polymer with a repeating unit of formula VIII as the main component is preferred:

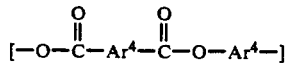

[VIII]

wherein the $Ar^4$ groups, independently, are divalent aromatic groups with at least one six-membered carbon ring. Examples of $Ar^4$ include:

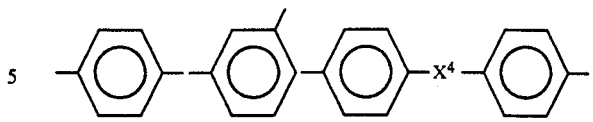

wherein $X^4$ is —O—, —S—, —CO——SO$_2$—, —SO—, alkyl that contains 1 to 5 carbon atoms.

In this invention, polyarylates with a repeating unit of the following formula are particularly preferred:

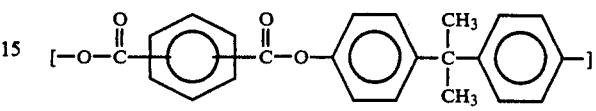

The polyarylates include U Polymer ® available from Unitika Corp., APE® available from Bayer Corp., DUREL® available from Hooker Corp., etc.

The liquid crystal polyester that can be used in the present invention can be obtained in the following way. (1) An aromatic dicarboxylic acid and an aromatic dihydroxy compound are polycondensed. (2) An aromatic hydroxycarboxylic acid is polycondensed. (3) An aromatic dicarboxylic acid, an aromatic dihydroxy compound, and an aromatic hydroxycarboxylic acid are polycondensed.

The following compounds are examples of aromatic dihydroxy compounds that can be used as a component of the above liquid crystal polyesters: resorcin, 4-acetylresorcin, hydroquinone, chlorohydroquinone, bromohydroquinone, methylhydroquinone, phenylhydroquinone (i.e., 2,5-dihydroxybiphenyl), methoxyhydroquinone, phenoxyhydroquinone, 4,4'-dihydroxybiphenyl, 3,3'-diphenyl-4,4'-dihydroxybiphenyl, 4,4'-dihydroxydiphenyl ether, 4,4'-dihydroxydiphenylsulfide, 4,4'-dihydroxydiphenylsulfone, 3,3'-diphenyl-4,4'-dihydroxydiphenylsulfone, 4,4'-dihydroxybenzophenone, 4,4'-dihydroxydiphenylmethane, Bisphenol A, 1,1-di(4-hydroxyphenyl)cyclohexane, 1,2bis(4-hydroxyphenoxy)ethane, 1,4-dihydroxynaphthalene, 2,6-dihydroxynaphthalene, etc. Of these aromatic dihydroxy compounds, those that can be used to give liquid crystal polyesters of high crystallinity are hydroquinone, 4,4'-dihydroxybiphenyl, 4,4'-dihydroxydiphenyl ether and 4,4'-dihydroxydiphenylsulfide.

The aromatic dicarboxylic acid mentioned above includes isophthalic acid, metal salts of 5-sulfoisophthalic acid, terephthalic acid, 4,4'-biphenyldicarboxylic acid, 4,4'-dicarboxydiphenyl ether, 4,4'-dicarboxydiphenylsulfide, 4,4'-dicarboxydiphenylsulfone, 3,3'-benzophenonedicarboxylic acid, 4,4'-benzophenonedicarboxylic acid, 1,2-bis(4-carboxyphenoxy)ethane, 1,4-naphthalenedicarboxylic acid, 2,6-naphthalenedicarboxylic acid, etc. Of these aromatic dicarboxylic acids, those that can be used to give liquid crystal polyesters of high crystallinity are terephthalic acid, 4,4'-biphenyldicarboxylic acid, 4,4'-dicarboxydiphenyl ether, 4,4'-dicarboxydiphenyl-sulfide, 4,4'-benzophenonedicarboxylic acid, 1,2-bis(4carboxyphenoxy)ethane, and 2,6-naphthalenedicarboxylic acid.

The aromatic hydroxycarboxylic acid mentioned above, includes salicylic acid, m-hydroxybenzoic acid, p-hydroxybenzoic acid, 3-chloro-4-hydroxybenzoic acid, 3-bromo-4-hydroxybenzoic acid, 3-methyl-4-hydroxy-benzoic acid, 3-phenyl-4-hydroxybenzoic acid, 3-methoxy-4-hydroxybenzoic acid, 4-hydroxy-4'-carboxybiphenyl, 2-hydroxy-6-carboxynaphthalene, etc. Of these aromatic hydroxycarboxylic acids, those that can be used to give liquid crystal polyesters of high crystallinity include p-hydroxybenzoic acid and 4-hydroxy-4'-carboxybiphenyl.

Liquid crystal polyesters that contain p-hydroxybenzoic acid are particularly suitable. The liquid crystal polyesters include EKONOL® available from Sumitomo Chemical Co., Ltd., and XYDAR® available from Dartco Corp., that have repeating units of the following formulae as the main component:

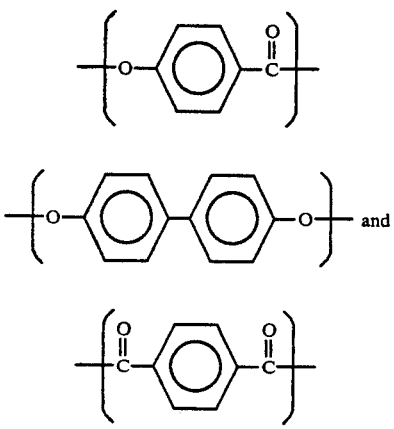

The liquid crystal polyesters also include VECTRA® available from Hoechst Celanese Corp., that has repeating units of the following formulae as the main component:

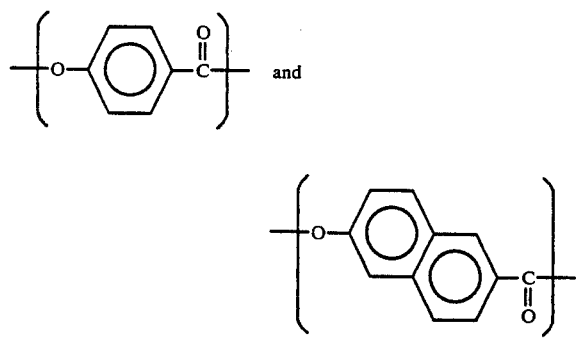

The liquid crystal polyesters further include X7G® available from Eastman Kodak Corp., NOVACCURATE® available from Mitsubishi Kasei Corp., IDEMITSU LCP® available from Idemitsu Sekiyu Kagaku Corp., etc.; all of these liquid crystal polyesters have repeating units of the following formulae as the main component:

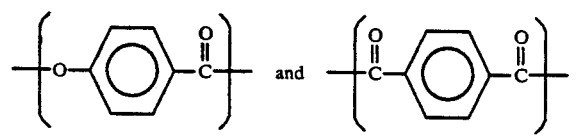

The polyamide-imide that can be used in the present invention is a polymer that essentially has amide linkages and imide linkages, and in particular, a polymer with a repeating unit of formula IX as the main component is preferred:

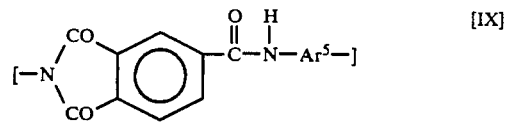

wherein $Ar^5$ is a divalent aromatic group with at least one six-membered carbon ring. Examples of $Ar^5$ include

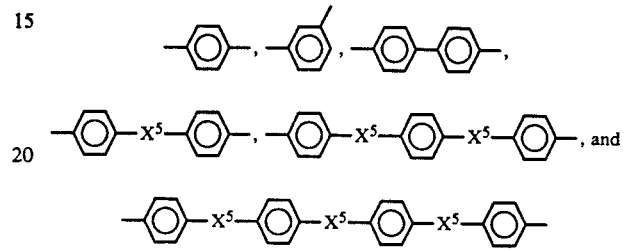

wherein $X^5$ is $-O-$, $-S-$, $-CO-$, $-SO_2-$, $-SO-$, or alkylene that contains 1 to 5 carbon atoms. Examples of such a polyamide-imide includes TORLON® available from Amoco Performance Products Corp., TI-5000® available from Toray Corp., etc.

As the polycarbonate that can be used in the present invention, a polymer with a repeating unit of formula X as the main component is preferred:

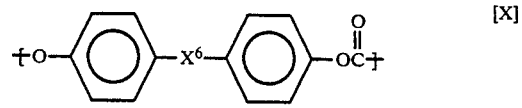

wherein $X^6$ is $-O-$, $-S-$, $-CO-$, $-SO_2-$, $-SO-$, or a divalent aliphatic group, alicyclic group, or phenylsubstituted alkylene that contains to 10 carbon atoms.

In this invention, a polycarbonate with a repeating unit of the following formula as the main component is particularly suitable:

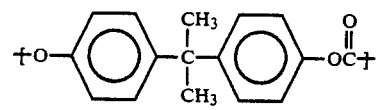

Examples of the polycarbonate include IUPILON® available from Mitsubishi Gas Kagaku Corp., PANLITE® available from Teijin Kasei Corp., NOVAREX® available from Mitsubishi Kasei Co., Ltd., LEXAN® available from GE Corp., MAKROLON® available from Bayer Corp., etc.

As the polyphenyleneoxide that can be used in the present invention, a polymer with a repeating unit of formula XI as the main component is preferred:

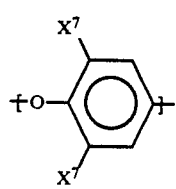

wherein $X^7$ is alkyl that contains 1 to 4 carbon atoms, alkoxy that contains 1 to 4 carbon atoms, or halogen.

In this invention, polyphenyleneoxide with the repeating unit of the following formula as the main component is particularly preferred:

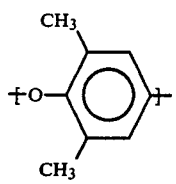

Polyphenylene oxide is not sold by itself commercially, but only as a mixture with other resins. For example, mixtures with styrene-type resins such as polystyrene, styrene-acrylonitrile copolymer, styrene-acrylonitrile-butadiene copolymer, styrene-methylmethacrylate copolymer; or with nylon are commercially available. This kind of product includes NORYL® and NORYL GTX® available from GE Corp., XYRON® available from Asahi Kasei Co., etc. Generally, 200-400 parts by weight of a styrene-type resin or nylon is mixed with 100 parts by weight of the polyphenyleneoxide.

An engineering plastic composition of this invention comprises an engineering plastic material and at least one p-quaterphenyl derivative selected from the group consisting of the compounds of formulae I, II, and III:

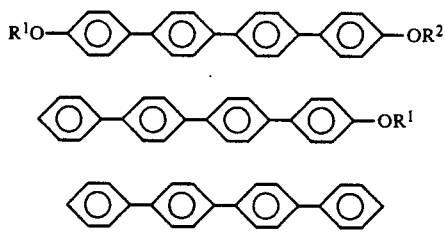

wherein $R^1$ and $R^2$, independently, are —H, —COCH$_3$, —CH$_2$CH$_2$OH, —CH$_2$CH$_2$OCOCH$_3$, —CH$_2$CH(CH$_3$)OH, —CH$_2$CH(CH$_3$)OCOCH$_3$, or alkyl containing from 1 to 15 carbon atoms. The alkyl may be straight or branched.

The p-quaterphenyl derivatives of formula I include 4,4'''-dihydroxy-p-quaterphenyl, 4,4'''-di(2-hydroxyethoxy)-p-quaterphenyl, 4,4'''-diacetoxy-p-quaterphenyl, 4,4'''-di(2-acetoxyethoxy)-p-quaterphenyl, 4,4'''-di(2-hydroxyisopropoxy)-p-quaterphenyl, 4,4'''-di(2-acetoxyisopropoxy)-p-quaterphenyl, 4,4'''-dimethoxy-p-quaterphenyl, 4,4'''-diethoxy-p-quaterphenyl, 4,4'''-dipropoxy-p-quaterphenyl, 4,4'''-dibutoxy-p-quaterphenyl, 4,4'''-dipentyloxy-p-quaterphenyl, 4,4'''-dihexyloxy-p-quaterphenyl, 4,4'''-diheptyloxy-p-quaterphenyl, 4,4'''-dioctyloxy-p-quaterpheny 4,4'''-dinonyloxy-p-quaterphenyl, 4,4'''-didecyloxy-p-quaterphenyl, 4,4'''-diundecyloxy-p-quaterpheny 4,4'''-didodecyloxy-p-quaterphenyl, 4,4'''-ditridecyloxy-p-quaterphenyl, 4,4'''-ditetradecyloxy-p-quaterphenyl, 4,4'''-dipentadecyloxy-p-quaterphenyl, etc.

The p-quaterphenyl derivatives of formula II include 4-hydroxy-p-quaterphenyl, 4-(2-hydroxyethoxy)-p-quaterphenyl, 4-acetoxy-p-quaterphenyl, 4-(2-acetoxyethoxy)-p-quaterphenyl, 4-(2-hydroxyisopropoxy)-p-quaterphenyl, 4-(2-acetoxyisopropoxy)-p-quaterphenyl, 4-methoxy-p-quaterphenyl, 4-ethoxy-p-quaterphenyl, 4-propoxy-p-quaterphenyl, 4-butoxy-p-quaterphenyl, 4-pentyloxy-p-quaterphenyl, 4-hexyloxy-p-quaterphenyl, 4-heptyloxy-p-quaterphenyl, 4-octyloxy-p-quaterphenyl, 4-nonyloxy-p-quaterphenyl, 4-decyloxy-p-quaterphenyl, 4-undecyloxy-p-quaterphenyl, 4-dodecyloxy-p-quaterphenyl, 4-tridecyloxy-p-quaterphenyl, 4-tetradecyloxy-p-quaterphenyl, 4-pentadecyloxy-p-quaterphenyl, etc.

The compound of formula III is p-quaterphenyl.

The preparations of representative compounds from among the various p-quaterphenyl derivatives with formulae I, II, and III will be described.

(a) 4,4'''-Dihydroxy-p-quaterphenyl (of formula I, with $R^1$ and $R^2$ both —H) can be obtained by the method described in *Journal of the Chemical Society*, 1379-85 (1940). Also, 4,4'''-dihydroxy-p-quaterphenyl can be obtained by the following method. First, 4-hydroxy-4'-bromobiphenyl is heated to react under pressure in the presence of alkali with use of a palladium catalyst, resulting in sodium salt of 4,4'''-dihydroxy-p-quaterphenyl. Then, acid is added to precipitate 4,4'''-dihydroxy-p-quaterphenyl.

(b) 4,4'''-Diacetoxy-p-quaterphenyl (of formula I, with $R^1$ and $R^2$ both —COCH$_3$) can be obtained by the acetoxylation of the compound obtained in section a above.

(c) 4,4'''-Di(2-hydroxyethoxy)-p-quaterphenyl (of formula I, with $R^1$ and $R^2$ both —CH$_2$CH$_2$OH) can be obtained by the addition of ethylene oxide to the compound obtained in section a above.

(d) 4,4'''-Di(2-acetoxyethoxy)-p-quaterphenyl (of formula I, with $R^1$ and $R^2$ both —CH$_2$CH$_2$OCOCH$_3$) can be obtained by the acetoxylation of the compound obtained in section c above.

(e) 4,4'''-Di(2-hydroxyisopropoxy)-p-quaterphenyl (of formula I, with $R^1$ and $R^2$ both —CH$_2$CH(CH$_3$)OH) can be obtained by the addition of propylene oxide to the compound obtained in section a above.

(f) 4,4'''-Di(2-acetoxyisopropoxy)-p-quaterphenyl (of formula I, with $R^1$ and $R^2$ both —CH$_2$CH(CH$_3$)OCOCH$_3$) can be obtained by the acetoxylation of the compound obtained in section e above.

(g) Dialkoxylated p-quaterphenyl (of formula I, with $R^1$ and $R^2$ alkyl groups with 1-15 carbon atoms) can be obtained by the etherification of the compound obtained in section a above by a well-known method.

If the number of carbon atoms of $R^1$ or $R^2$ is more than 15, the liquid-crystal transition temperature of this compound becomes low. If a compound with such a low liquid-crystal transition temperature is added in the engineering plastic composition, the heat stability of the engineering plastic material will be lowered.

(h) 4-Hydroxy-p-quaterphenyl (of formula II, with $R^1$ —H) can be obtained by the demethylation of the compound obtained in section n below.

(i) 4-Acetoxy-p-quaterphenyl (of formula II, with $R^1$ —COCH$_3$) can be obtained by the acetoxylation of the compound obtained in section h above.

(j) 4-(2-Hydroxyethoxy)-p-quaterphenyl (of formula II, with $R^1$ —CH$_2$CH$_2$OH) can be obtained by the addition of ethylene oxide to the compound obtained in section h above.

(k) 4-(2-Acetoxyethoxy)-p-quaterphenyl (of formula II, with $R^1$ —CH$_2$CH$_2$OCOCH$_3$) can be obtained by the acetoxylation of the compound obtained in section j above.

(l) 4-(2-Hydroxyisopropoxy)-p-quaterphenyl (of formula II, with $R^1$ —$CH_2CH(CH_3)OH$) can be obtained by the addition of propylene oxide to the compound obtained in section h above.

(m) 4-(2-Acetoxyisopropoxy)-p-quaterphenyl (of formula II, with $R^1$ —$CH_2CH(CH_3)OCOCH_3$) can be obtained by the acetoxylation of the compound obtained in section l above.

(n) Monoalkoxylated p-quaterphenyl (of formula II, with $R^1$ an alkyl group with 1-15 carbon atoms) can be obtained by using the method of Kumada et al. (*Bulletin of the Chemical Society of Japan*, 49 (7) 1958 (1976)), which involves a cross-coupling reaction of halogenated alkoxybiphenyl with Grignard reagent of biphenyl using Ni catalyst.

If the number of carbon atoms of $R^1$ is more than 15, the liquid crystal transition temperature of the compound will be low.

(o) p-Quaterphenyl can be obtained by a method similar to that of section n, which method involves a cross-coupling reaction of halogenated biphenyl with a Grignard reagent of biphenyl and with Ni catalyst.

An engineering plastic composition according to this invention can be prepared by the commonly known methods. For example, there is the method of causing adhesion between granules of the engineering plastic material and powder of p-quaterphenyl derivatives by mixing the granules of the engineering plastic material and powder of the p-quaterphenyl derivatives together. Also, there is the method in which the engineering plastic material and the p-quaterphenyl derivative are melted and mixed together. In order to mix the engineering plastic material and p-quaterphenyl derivatives uniformly, methods for melting and kneading by the use of an extruder, kneader, plastograph, or the like are particularly preferred.

In this invention, per 100 parts by weight of the engineering plastic material, the p-quaterphenyl derivative is used at the proportion of 0.1-15 parts by weight, preferably at the proportion of 0.5-12 parts by weight, and more preferably at the proportion of 0.7-10 parts by weight. If the proportion of the p-quaterphenyl derivative is less than 0.1 part by weight per 100 parts by weight of the engineering plastic material, the melt viscosity of the engineering plastic material does not decrease. If the proportion of the p-quaterphenyl derivative is more than 15 parts by weight per 100 parts by weight of the engineering plastic material, the melt viscosity of the engineering plastic material does not decrease so much below a certain value, and the properties of the engineering plastic material, such as its heat stability and mechanical properties, are worsened. Accordingly, per 100 parts by weight of the engineering plastic material, the p-quaterphenyl derivative should be used at the proportion of 0.1-15 parts by weight. Any of the p-quaterphenyl derivatives or a mixture thereof can be used.

In the composition of this invention that contains engineering plastic materials and p-quaterphenyl derivatives, it is possible to include reinforcing fibers for the purposes of increasing the heat stability and improving the mechanical properties, provided that the composition is suitable for practical use. Per 100 parts by weight of the engineering plastic material, reinforcing fibers can be added at the proportion of 1.0-400 parts by weight, and preferably at the proportion of 5-200 parts by weight. If the proportion of the reinforcing fibers is less than 1.0 part by weight per 100 parts by weight of the engineering plastic material, the additive effect by which the mechanical strength of the engineering plastic composition is increased is small. If the proportion of the reinforcing fibers is more than 400 parts by weight per 100 parts by weight of the engineering plastic material, the melt viscosity of the mixture becomes higher, and the moldability of the mixture is poor.

As reinforcing fibers, glass fibers, carbon fibers, boron fibers, silicon carbide fibers, graphite fibers, alumina fibers, amorphous-metal fibers, silicon-titanium-carbon inorganic fibers, aramide fibers, and the like can be used for preference. In particular, glass fibers with a diameter of 1-50 m and the length of 0.1 mm to 5 cm that are used to reinforced plastics are suitable for use.

In the engineering plastic composition of this invention, it is possible to include stabilizers, flame retardants, antistatic agents, mold releasing agents, pigments, and the like within the limits in which the practical properties of the composition are not worsened, for the purposes of increasing heat stability or improving the mechanical properties, etc.

Articles are obtained from the engineering plastic composition by compression molding, extrusion molding, injection molding, blow-molding, or similar melt-molding techniques. The article may be machine parts, parts for electronic products, film, pipes, etc., that have excellent heat stability, mechanical properties, and the like.

When polycarbonate is the engineering plastic material used in the composition, it is possible to obtain optical molded products, for example, optical disks, various kinds of lenses, and so on, that are transparent and have very low degree of double refraction.

EXAMPLES

Below, this invention will be explained with reference to examples.

The properties of the engineering plastic compositions obtained in the following examples and comparative examples were evaluated by the following methods.

Measurement of Physical Properties (a) Liquid-crystal transition temperature The liquid-crystal transition temperature was defined as the first peak of a heat absorbance curve measured with an apparatus for differential thermal analysis.

(b) Melt viscosity

The average of the results of tests measured three times by the method of JIS K7210 (flowability test; auxiliary test) with a Koka-type flow tester, was calculated. The measurements were done with a plunger with the cross-sectional area of 1 cm$^2$, a die that was 10 mm long with a 1 mm diameter, and a load of 100 kg. The temperature used is given in the corresponding tables of examples.

(c) Mechanical properties (tensile modulus, tensile strength, and elongation at rupture)

Measurements were done by the method of ASTM D638. The sample was stretched at the rate of 25 mm/min.

(d) Deflection temperature

Measurement was done with a load of 18.6 kg/cm$^2$ by the method of ASTM D648.

(e) Spiral flow

The flow length of the sample when injection-molded at an injection pressure of 2200 kg/cm$^2$, a molding temperature of 340°-350° C., and a mold temperature of 200° C. in a mold that had a spiral-shaped groove 5 mm wide and 2.5 mm deep was measured.

(f) Double refraction and light transmission

The double refraction of a portion 40 mm from the center of a disk with a diameter of 130 mm and a thickness of 1.2 mm made by injection molding of the sample was measured by means of a polarization microscope. The degree of light transmission of the portion is also measured by means of a haze meter.

Preparation of P-Quaterphenyl Derivatives (A) 4,4'''-Dihydroxy-p-quaterphenyl

Into an 1-liter stainless steel autoclave were added 60.0 g of 4-hydroxy-4'-bromobiphenyl, 100 g of methanol, 300 g of a 10% (by weight) aqueous solution of sodium hydroxide, and 13 g of a palladiumcarbon containing 5% by weight of palladium and a reaction was carried out at 120° C. for 4 hours under 5 atmospheric pressures. The precipitated disodium salt of 4,4'''-dihydroxy-p-quaterphenyl was filtered and dissolved into N,N-dimethyl-formamide. The catalyst was removed by filtration with heating at 60° C. An addition of dilute sulfuric acid to the filtrate gave white crystalline powder of 4,4'''-dihydroxy-p-quaterphenyl (DHQ), which was purified by washing with methanol. The liquid-crystal transition temperature of the DHQ was 336° C.

(F) 4,4'''-Diethoxy-p-quaterphenyl

Except for the use of 4-ethoxy-4'-bromobiphenyl instead of the 4-hydroxy-4'-bromobiphenyl, 4,4'''-diethoxy-p-quaterphenyl (DEQ) was obtained according to the procedure of section (A) mentioned above. The liquid-crystal transition temperature of the DEQ was 356° C.

(G) 4,4'''-Dipropoxy-p-quaterphenyl

Except for the use of 4-propoxy-4'-bromobiphenyl instead of the 4-hydroxy-4'-bromobiphenyl, 4,4'''-dipropoxy-p-quaterphenyl (DPQ) was obtained according to the procedure of section (A) mentioned above. The liquid-crystal transition temperature of the DPQ was 335° C.

(H) 4,4'''-Dibutoxy-p-quaterphenyl

Except for the use of 4-butoxy-4'-bromobiphenyl instead of the 4-hydroxy-4'-bromobiphenyl, 4,4'''-dibutoxy-p-quaterphenyl (DBQ) was obtained according to the procedure of section (A) mentioned above. The liquid-crystal transition temperature of the DBQ was 335° C.

(I) 4,4'''-Diheptyloxy-p-quaterphenyl

Except for the use of 4-heptyloxy-4'-bromobiphenyl instead of the 4-hydroxy-4'-bromobiphenyl, 4,4'''-diheptyloxy-p-quaterphenyl (DHPQ) was obtained according to the procedure of section (A) mentioned above. The liquid-crystal transition temperature of the DHPQ was 299° C.

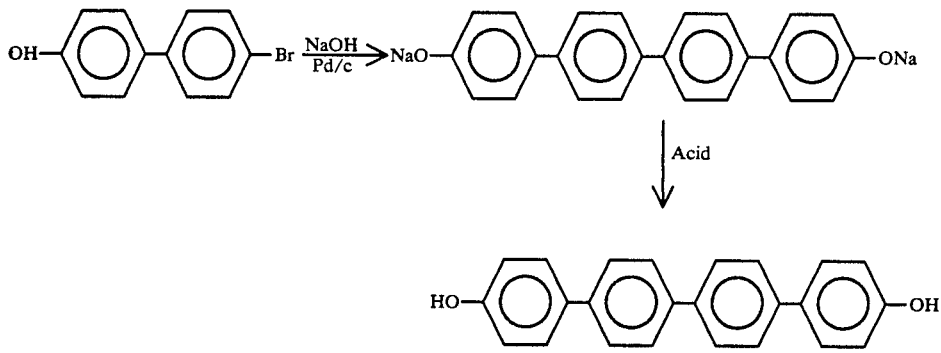

(B) 4-4'''-Diacetoxy-p-quaterphenyl

By the reaction of the DHQ obtained in section (A) mentioned above with acetic anhydride, 4,4'''-diacetoxy-p-quaterphenyl (DAQ) was obtained. The liquid-crystal transition temperature of the DAQ was 340° C.

(C) 4,4'''-Di(2-hydroxyethoxy)-p-quaterphenyl

By the reaction of the DHQ obtained in section (A) mentioned above with ethylene oxide, 4,4'''-di(2-hydroxyethoxy)-p-quaterphenyl (DHEQ) was obtained. The liquid-crystal transition temperature of the DHEQ was 403° C.

(D) 4,4'''-Di(2-acetoxyethoxy)-p-quaterphenyl

By the reaction of the DHEQ obtained in section (C) mentioned above with acetic anhydride, 4,4'''-di(2-acetoxyethoxy)-p-quaterphenyl (DAEQ) was obtained. The liquid-crystal transition temperature of the DAEQ was 329° C.

(E) 4,4'''-Dimethoxy-p-quaterphenyl

Except for the use of 4-methoxy-4'-bromo-biphenyl instead of the 4-hydroxy-4'-bromobiphenyl, 4,4'''-dimethoxy-p-quaterphenyl (DMQ) was obtained according to the procedure of section (A) mentioned above. The liquid-crystal transition temperature of the DMQ was 340° C.

(J) 4,4'''-Dioctyloxy-p-quaterphenyl

Except for the use of 4-octyloxy-4'-bromobiphenyl instead of the 4-hydroxy-4'-bromobiphenyl, 4,4'''-dioctyloxy-p-quaterphenyl (DOQ) was obtained according to the procedure of section (A) mentioned above. The liquid-crystal transition temperature of the DOQ was 294° C.

(K) 4,4'''-Didodecyloxy-p-quaterphenyl

Except for the use of 4-dodecyloxy-4'-bromobiphenyl instead of the 4-hydroxy-4'-bromobiphenyl, 4,4'''-didodecyloxy-p-quaterphenyl (DDQ) was obtained according to the procedure of section (A) mentioned above. The liquid-crystal transition temperature of the DDQ was 266° C.

(L) 4-Metoxy-p-quaterphenyl

By use of a cross-coupling reaction of Grignard reagent with a halogen compound by Ni catalyst, 4-metoxy-p-quaterphenyl was obtained (Kumada et al., *Bulletin of the Chemical Society of Japan*, 49(7), 1958 (1976)).

First, 3.6 g (150 mmol) of magnesium was put in a three-necked flask that was completely dry, and under a nitrogen atmosphere, 150 ml of anhydrous tetrahydrofuran (THF) that contained 33.6 g (132 mmol) of 4- bromobiphenyl was added dropwise with a dropping funnel. After 20 ml had been added, the reaction was started by the addition of 0.02 g of iodine at room temperature. The entire amount of the THF solution was added over a period of about 1 hour. An exothermic reaction proceeded, and the reaction mixture became pale brown. Then, the mixture was stirred for 2 hours at room temperature to complete the reaction. Grignard reagent was thus obtained.

15 In another 1-liter three-necked flask, 31.5 g (120 mmol) of 4-bromo-4'-metoxybiphenyl and 108 mg (0.2 mmol) of $NiCl_2(1,3$-bis(diphenylphosphino)propane) ($NiCl_2$(dppp)) were added, which were dissolved into 500 ml of anhydrous THF. This solution was kept at 0° C. under a nitrogen atmosphere, and the Grignard reagent was added dropwise over a period of about 1 hour with stirring. During the addition, the orange color of the Ni catalyst disappeared, and the reaction mixture became brown. The reaction mixture was then refluxed with stirring for 5 hours to complete the reaction. After the reaction, the precipitated white solid was filtered, and washed with a small amount of THF. Recrystallization from sulforane gave 30.6 g (yield, 76%) of 4-metoxy-p-quaterphenyl (MQ). The liquid-crystal transition temperature of the MQ was 328° C.

(M) 4-Hydroxy-p-quaterphenyl

First, 25.2 g (75 mmol) of MQ obtained in section (L) mentioned above was suspended to 500 ml of methylene chloride in an 1-liter three-necked flask. To this suspension, 50 ml of a methylene chloride solution containing 19.0 g (75 mmol) of boron tribromide was added dropwise over a period of about 30 minutes with stirring under a nitrogen atmosphere. Then, the reaction mixture was refluxed for 10 hours with stirring under the nitrogen atmosphere. After the reaction was completed, the flask was cooled, and the solids that precipitated were obtained by filtration. The solids were washed with methylene chloride and dried. Then the solid was recrystallized with dimethylsulfoxide. In this way, 21.6 g (yield, 89%) of 4-hydroxy-p-quaterphenyl (HQ) was obtained as a white solid. The liquid-crystal transition temperature of HQ was 352° C.

(N) 4-(2-Hydroxyethoxy)-p-quaterphenyl

First, 19.2 g (60 mmol) of the HQ obtained in section (M) mentioned above was put in an 1-liter three-necked flask, and dissolved by the addition of 500 ml of sulforane. To this solution, 7.92 g (90 mmol) of ethylene carbonate was added, and the mixture was heated under a nitrogen atmosphere. Then 0.1 g of $K_2CO_3$ was added at the reflux temperature of sulforane, and reflux was continued for 4 hours with stirring. After the reaction was completed, the reaction mixture was filtered and the filtrate was cooled. The white solid that was precipitated was collected by filtration and dried. In this way, 18.38 g (yield, 83% of 4-(2-hydroxyethoxy)-p-quaterphenyl (HEQ) was obtained. The liquid-crystal transition temperature of HEQ was 335° C.

(O) p-Quaterphenyl p-Quaterphenyl (Q) was obtained according to the procedure of section (A) mentioned above, except for the use of 4-bromobiphenyl instead of 4-hydroxy-4'bromobiphenyl. The liquid-crystal transition temperature of the Q was 311° C.

POLYETHERIMIDE COMPOSITION

Examples 1-3 and Comparative Examples 1-3

One hundred parts by weight of polyetherimide (GE Corp., ULTEM ® 1000) and each of the predetermined amounts of DHQ listed in Table 1 were melted and mixed with in a plastograph at 360° C. for 3 minutes, resulting in a polyetherimide composition.

The melt viscosity of each of the polyetherimide compositions was measured at 340° C. These results are shown in Table 1.

A sheet 1 mm thick and a sheet 4 mm thick were obtained by compression-molding of the polyetherimide composition at 340° C. for 2 minutes at the pressure of 150 kg/cm$^2$ The mechanical properties of a sheet 1 mm thick and deflection temperature of a sheet 4 mm thick were measured; the results are shown in Table 1.

Examples 4-6 and Comparative Examples 4 and 5

Polyetherimide compositions were prepared in the same way as in Example 1, except that DHEQ was used instead of DHQ in the amounts shown in Table 2 and that the fusion temperature was 420° C. The temperature for the measurement of the melt viscosity was 400° C. A sheet 1 mm thick and a sheet 4 mm thick were obtained by injection molding of the polyetherimide composition. The injection pressure for the composition was 1700 kg/cm$^2$, the molding temperature was 400° C., and the temperature of the mold was 120° C. In the same way as for Example 1, the properties of these sheet were evaluated. The results are shown in Table 2.

Examples 7-9 and Comparative Examples 6 and 7

Polyetherimide compositions were prepared in the same way as in Example 1, except that DAEQ was used instead of DHQ in the amounts shown in Table 3. In the same way as in Example 1, sheets were obtained, and the properties of both the composition and the sheets were evaluated. The results are shown in Table 3.

Examples 10-12 and Comparative Examples 8 and 9

Polyetherimide compositions were prepared in the same way as in Example 1, except that DMQ was used instead of DHQ in the amounts shown in Table 4, and that the fusion temperature was 420° C. In the same way as in Example 4, sheets were obtained, and the properties of both the composition and the sheets were evaluated. The results are shown in Table 4.

Examples 13-15 and Comparative Examples 10 and 11

Polyetherimide compositions were prepared in the same way as in Example 1, except that DBQ was used instead of DHQ in the amounts shown in Table 5. In the same way as in Example 1, sheets were obtained, and the properties of both the composition and the sheets were evaluated. The results are shown in Table 5.

Examples 16-18 and Comparative Examples 12 and 13

Polyetherimide compositions were prepared in the same way as in Example 1, except that HEQ was used instead of DHQ in the amounts shown in Table 6. In the same way as in Example 1, sheets were obtained, and the properties of both the composition and the sheets were evaluated. The results are shown in Table 6.

Examples 19-21 and Comparative Examples 14 and 15

Polyetherimide compositions were prepared in the same way as in Example 4, except that Q was used instead of DHQ in the amounts shown in Table 7. In the same way as in Example 4, sheets were obtained, and the properties of both the composition and the sheets were evaluated. The results are shown in Table 7.

POLYARYLKETONE COMPOSITION

Examples 22-24 and Comparative Examples 16-18

One hundred parts by weight of polyetheretherketone (ICI Corp., VICTREX PEEK ® 15P-F) and each of the predetermined amounts of DHQ listed in Table 8 were melted and mixed with in a plastograph at 370° C. for 3 minutes, resulting in a polyetheretherketone composition. The melt viscosity of each of the compositions was measured at the temperature of 360° C. The polyetheretherketone composition was compression-molded for 2 minutes at the pressure of 150 kg/cm$^2$ and the temperature of 360° C. to give a sheet 1 mm thick and a sheet 4 mm thick. The properties of these sheets were evaluated in the same way as in Example 1 and the results are shown in Table 8.

Examples 25-27 and Comparative Example 19

Polyetheretherketone compositions were prepared in the same way as in Example 22, except that DHEQ was used instead of DHQ in the amounts shown in Table 9, and that the fusion temperature was 420° C. The polyetheretherketone composition was compression-molded for 2 minutes at the pressure of 150 kg/cm$^2$ and the temperature of 340° C. to give a sheet 1 mm thick and a sheet 4 mm thick. The properties of both the composition and these sheets were evaluated in the same way as in Example 22 and the results are shown in Table 9.

Examples 28-30 and Comparative Examples 20 and 21

Polyetheretherketone compositions were prepared in the same way as in Example 22, except that DAEQ was used instead of DHQ in the amounts shown in Table 10. In the same way as in Example 22, sheets were obtained, and the properties of both the composition and the sheets were evaluated. The results are shown in Table 10.

Examples 31-33 and Comparative Examples 22 and 23

Polyetheretherketone compositions were prepared in the same way as in Example 22, except that DEQ was used instead of DHQ in the amounts shown in Table 11. In the same way as in Example 22, sheets were obtained, and the properties of both the composition and the sheets were evaluated. The results are shown in Table 11.

Examples 34-36 and Comparative Examples 24 and 25

Polyetheretherketone compositions were prepared in the same way as in Example 22, except that DBQ was used instead of DHQ in the amounts shown in Table 12. In the same way as in Example 22, sheets were obtained, and the properties of both the composition and the sheets were evaluated. The results are shown in Table 12.

Examples 37-39 and Comparative Examples 26 and 27

Polyetheretherketone compositions were prepared in the same way as in Example 22, except that HQ was used instead of DHQ in the amounts shown in Table 13. In the same way as in Example 22, sheets were obtained, and the properties of both the composition and the sheets were evaluated. The results are shown in Table 13.

POLYSULFONE COMPOSITION

Examples 40-42 and Comparative Examples 28-30

One hundred parts by weight of polysulfone (ICI Corp., VICTREX PES ® 4800G) and each of the predetermined amounts of DHQ listed in Table 14 were melted and mixed with together in a plastograph at 360° C. for 3 minutes, resulting in a polysulfone composition. The melt viscosity of each of the compositions was measured at the temperature of 350° C. The polysulfone composition was compression-molded for 2 minutes at the pressure of 150 kg/cm$^2$ and the temperature of 360° C. to give a sheet 1 mm thick and a sheet 4 mm thick. The properties of both the composition and these sheets were evaluated in the same way as in Example 1 and the results are shown in Table 14.

Examples 43-45 and Comparative Examples 31 and 32

Polysulfone compositions were prepared in the same way as in Example 40, except that DAQ was used instead of DHQ in the amounts shown in Table 15. In the same way as in Example 40, sheets were obtained, and the properties of both the composition and the sheets were evaluated. The results are shown in Table 15.

Examples 46-48 and Comparative Examples 33 and 34

Polysulfone compositions were prepared in the same way as in Example 40, except that DHEQ was used instead of DHQ in the amounts shown in Table 16, and that the fusion temperature was 400° C. In the same way as in Example 40, sheets were obtained, and the properties of both the composition and the sheets were evaluated. The results are shown in Table 16.

Examples 49-51 and Comparative Examples 35 and 36

Polysulfone compositions were prepared in the same way as in Example 40, except that DAEQ was used instead of DHQ in the amounts shown in Table 17. In the same way as in Example 40, sheets were obtained, and the properties of both the composition and the sheets were evaluated. The results are shown in Table 17.

Examples 52-54 and Comparative Examples 37 and 38

Polysulfone compositions were prepared in the same way as in Example 40, except that DBQ was used instead of DHQ in the amounts shown in Table 18. In the same way as in Example 40, sheets were obtained, and the properties of both the composition and the sheets were evaluated. The results are shown in Table 18.

Examples 55-57 and Comparative Examples 39 and 40

Polysulfone compositions were prepared in the same way as in Example 40, except that HQ was used instead of DHQ in the amounts shown in Table 19. In the same way as in Example 40, sheets were obtained, and the properties of both the composition and the sheets were evaluated. The results are shown in Table 19.

Examples 58-60 and Comparative Example 41

Polysulfone compositions were prepared in the same way as in Example 40 except for the use of 100 parts by weight of polysulfone (UCC Corp. UDEL ® P-1700) and the predetermined amounts of DHQ, DAEQ, and DBQ shown in Table 20. Sheets were obtained in the same way as in Example 40, and the properties of both the composition and the sheets were evaluated. The results are shown in Table 20.

POLYPHENYLENESULFIDE COMPOSITION

Examples 61-63 and Comparative Examples 42-44

One hundred parts by weight of polyphenylene-sulfide (Torpren Corp., TORPREN® T-4) and each of the predetermined amounts of DHQ listed in Table 21 were melted and mixed with together in a plastograph at 350° C. for 3 minutes, resulting in a polyphenylenesulfide composition. The polyphenylenesulfide composition was compression-molded for 2 minutes at the pressure of 150 kg/cm$^2$ and the temperature of 350° C. to give a sheet 1 mm thick and a sheet 4 mm thick. The properties of both the composition and these sheets were evaluated in the same way as in Example 1 and the results are shown in Table 21.

Examples 64-66 and Comparative Examples 45 and 46

Polyphenylenesulfide compositions were prepared in the same way as in Example 61, except that DHEQ was used instead of DHQ in the amounts shown in Table 22, and that the fusion temperature was 400° C. In the same way as in Example 61, sheets were obtained, and the properties of both the composition and the sheets were evaluated. The results are shown in Table 22.

Examples 67-69 and Comparative Examples 47 and 48

Polyphenylenesulfide compositions were prepared in the same way as in Example 64, except that DAEQ was used instead of DHQ in the amounts shown in Table 23. In the same way as in Example 61, sheets were obtained, and the properties of both the composition and the sheets were evaluated. The results are shown in Table 23.

Examples 70-72 and Comparative Examples 49 and 50

Polyphenylenesulfide compositions were prepared in the same way as in Example 61, except that DBQ was used instead of DHQ in the amounts shown in Table 24. In the same way as in Example 61, sheets were obtained, and the properties of both the composition and the sheets were evaluated. The results are shown in Table 24.

Examples 73-75 and Comparative Examples 51 and 52

Polyphenylenesulfide compositions were prepared in the same way as in Example 61, except that HQ was used instead of DHQ in the amounts shown in Table 25. In the same way as in Example 61, sheets were obtained, and the properties of both the composition and the sheets were evaluated. The results are shown in Table 25.

POLYARYLATE COMPOSITION

Examples 76-78 and Comparative Examples 53-55

One hundred parts by weight of polyarylate (Unitika Corp., U polymer® U-100) and each of the predetermined amounts of DHQ listed in Table 26 were melted and mixed with together in a plastograph at 350° C. for 3 minutes, resulting in a polyarylate composition. The melt viscosity of each of the composition was measured at the temperature of 360° C. The polyarylate composition was compression-molded for 2 minutes at the pressure of 150 kg/cm$^2$ and the temperature of 360° C. to give a sheet 1 mm thick and a sheet 4 mm thick. The properties of these sheets were evaluated in the same way as in Example 1 and the results are shown in Table 26.

Examples 79-81 and Comparative Examples 56 and 57

Polyarylate compositions were prepared in the same way as in Example 76, except that DAEQ was used instead of DHQ in the amounts shown in Table 27. In the same way as in Example 76, sheets were obtained, and the properties of both the composition and the sheets were evaluated. The results are shown in Table 27.

Examples 82-84 and Comparative Examples 58 and 59

Polyarylate compositions were prepared in the same way as in Example 76, except that DBQ was used instead of DHQ in the amounts shown in Table 28. In the same way as in Example 76, sheets were obtained, and the properties of both the composition and the sheets were evaluated. The results are shown in Table 28.

Examples 85-87 and Comparative Examples 60 and 61

Polyarylate compositions were prepared in the same way as in Example 76, except that DHPQ was used instead of DHQ in the amounts shown in Table 29. In the same way as in Example 76, sheets were obtained, and the properties of both the composition and the sheets were evaluated. The results are shown in Table 29.

Examples 88-90 and Comparative Examples 62 and 63

Polyarylate compositions were prepared in the same way as in Example 76, except that HEQ was used instead of DHQ in the amounts shown in Table 30. In the same way as in Example 76, sheets were obtained, and the properties of both the composition and the sheets were evaluated. The results are shown in Table 30.

COMPOSITION OF LIQUID CRYSTAL POLYESTER

Examples 91-93 and Comparative Examples 64-66

One hundred parts by weight of liquid crystal polyester (Sumitomo Chemical Co., Ltd., EKONOL® E-2000) and each of the predetermined amounts of DHQ listed in Table 31 were melted and mixed with together in a plastograph at 400° C. for 3 minutes, resulting in a liquid crystal polyester composition. The melt viscosity of each of the composition was measured at the temperature of 380° C. The liquid crystal polyester composition was compression-molded for 2 minutes at the pressure of 150 kg/cm$^2$ and the temperature of 380° C. to give a sheet 1 mm thick and a sheet 4 mm thick. The properties of these sheets were evaluated in the same way as in Example 1 and the results are shown in Table 31.

Examples 94-96 and Comparative Examples 67 and 68

Liquid crystal polyester compositions were prepared in the same way as in Example 91, except that DOQ was used instead of DHQ in the amounts shown in Table 32. In the same way as in Example 91, sheets were obtained, and the properties of both the composition and the sheets were evaluated. The results are shown in Table 32.

Examples 97-99 and Comparative Examples 69 and 70

Liquid crystal polyester compositions were prepared in the same way as in Example 91, except that HEQ was used instead of DHQ in the amounts shown in Table 33. In the same way as in Example 91, sheets were obtained, and the properties of both the composition and the sheets were evaluated. The results are shown in Table 33.

POLYAMIDE-IMIDE COMPOSITION

Examples 100–102 and Comparative Examples 71–73

Polyamide-imide compositions were prepared by mixing 100 parts by weight of polyamide-imide (Amoco Performance Products Corp., Torlon ® 4203L) and the predetermined amounts of DHQ listed in Table 34, and the mixture was dried at 120° C. for 8 hours. The polyamide-imide composition obtained was injection-molded and its spiral flow was measured.

Next, injection molding was done to give a sheet 1 mm thick and a sheet 4 mm thick. The injection pressure for the composition was 2200 kg/cm$^2$, the molding temperature was 340°–350° C. and the temperature of the mold was 200° C. These sheets were postcured at 165° C. for 24 hours, at 245° C. for 24 hours, and at 260° C. for 24 hours, and the properties of both the composition and the sheets were evaluated in the same way as in Example 1. The results are shown in Table 34.

Examples 103–105 and Comparative Examples 74 and 75

Polyamide-imide compositions were prepared in the same way as in Example 100, except that DPQ was used instead of DHQ in the amounts shown in Table 35. In the same way as in Example 100, sheets were obtained, and the properties of both the composition and the sheets were evaluated. The results are shown in Table 35.

Examples 106–108 and Comparative Examples 76 and 77

Polyamide-imide compositions were prepared in the same way as in Example 100, except that MQ was used instead of DHQ in the amounts shown in Table 36. In the same way as in Example 100, sheets were obtained, and the properties of both the composition and the sheets were evaluated. The results are shown in Table 36.

POLYCARBONATE COMPOSITION

Examples 109–111 and Comparative Examples 78 and 80

One hundred parts by weight of polycarbonate (Teijin Kasei Corp., PANLITE ® L-1225L) and each of the predetermined amounts of DHQ listed in Table 37 were melted and mixed with together in a plastograph at 340° C. for 3 minutes, resulting in a polycarbonate composition. The melt viscosity of each of the compositions was measured at the temperature of 300° C. The composition was supplied to an injection molding machine, and molded at the injection pressure of 1400 kg/cm$^2$ The molding temperature was 340° C., and the temperature of the mold was 100° C. A disk was formed that had a diameter of 130 mm and a thickness of 1.2 mm. The double refraction and the degree of light transmission of a portion of this plate 40 mm from the center of the disk were measured.

The composition that was mixed in a plastograph was compression-molded for 2 minutes at the pressure of 150 kg/cm$^2$ and the temperature of 340° C. to give a sheet 1 mm thick and a sheet 4 mm thick. The properties of these sheets were evaluated in the same way as in Example 1, and the results are shown in Table 37.

Examples 112–114 and Comparative Examples 81–83

One hundred parts by weight of glass-fiber reinforced polycarbonate (Teijin Kasei Co. Ltd., PANLITE ® G-3130; 30 wt% glass fibers, with glass fibers 20 μm diameter and 0.2–1.0 mm long) and each of the predetermined amounts of DHQ shown in Table 38 were melted and mixed with together in a plastograph at 340° C. for 3 minutes, resulting in a polycarbonate composition. The melt viscosity of each of the compositions was measured at 260° C. The composition was compression-molded in the same way as in Example 109 to give a sheet 1 mm thick and a sheet 4 mm thick. The properties of these sheets were evaluated, and the results are shown in Table 38.

Examples 115–117 and Comparative Examples 84 and 85

Polycarbonate compositions were prepared in the same way as in Example 109, except that DDQ was used instead of DHQ in the amounts shown in Table 39. In the same way as in Example 109, a disk and sheets were obtained, and the properties of the composition, the disk and the sheets were evaluated. The results are shown in Table 39.

Examples 118–120 and Comparative Examples 86 and 87

Polycarbonate compositions were prepared in the same way as in Example 112, except that DDQ was used instead of DHQ in the amounts shown in Table 40. In the same way as in Example 112, sheets were obtained, and the properties of the composition and the sheets were evaluated. The results are shown in Table 40.

Examples 121–123 and Comparative Examples 88 and 89

Polycarbonate compositions were prepared in the same way as in Example 109, except that MQ was used instead of DHQ in the amounts shown in Table 41. In the same way as in Example 109, a disk and sheets were obtained, and the properties of the composition, the disk and the sheets were evaluated. The results are shown in Table 41.

Examples 124–126 and Comparative Examples 90 and 91

Polycarbonate compositions were prepared in the same way as in Example 112, except that MQ was used instead of DHQ in the amounts shown in Table 42. In the same way as in Example 112, sheets were obtained, and the properties of the composition and the sheets were evaluated. The results are shown in Table 42.

POLYPHENYLENEOXIDE COMPOSITION

Examples 127–129 and Comparative Examples 92–94

One hundred parts by weight of modified polyphenyleneoxide (GE Corp., NORYL ® 534J) and each of the predetermined amounts of DOQ listed in Table 43 were melted and mixed with together in a plastograph at 300° C. for 3 minutes, resulting in a polyphenyleneoxide composition. The melt viscosity of each of the compositions was measured at the temperature of 300° C. The polyphenyleneoxide composition was compression-molded for 2 minutes at the pressure of 150 kg/cm² and the temperature of 320° C. to give a sheet 1 mm thick and a sheet 4 mm thick. The properties of these sheets were evaluated in the same way as in Example 1 and the results are shown in Table 43.

Examples 130–132 and Comparative Examples 95–97

Polyphenyleneoxide compositions were prepared in the same way as in Example 127, except that 100 parts by weight of glass-fiber reinforced polyphenyleneoxide (GE, Corp. NORYL® -GFN3J, 30 wt% glass fibers, with glass fibers 20 μm diameter and 0.2–1.0 mm long) and the amounts of DOQ listed in Table 44 were used. In the same way as in Example 127, sheets were obtained, and the properties of both the composition and the sheets were evaluated. The results are shown in Table 44.

Examples 133–135 and Comparative Examples 98 and 99

Polyphenyleneoxide compositions were prepared in the same way as in Example 127, except that DDQ was used instead of DOQ in the amounts shown in Table 45. In the same way as in Example 127, sheets were obtained, and the properties of both the composition and the sheets were evaluated. The results are shown in Table 45.

Examples 136–138 and Comparative Examples 100 and 101

Polyphenyleneoxide compositions were prepared in the same way as in Example 130, except that DDQ was used instead of DOQ in the amounts shown in Table 46. In the same way as in Example 127, sheets were obtained, and the properties of both the composition and the sheets were evaluated. The results are shown in Table 46.

Examples 139–141 and Comparative Examples 102 and 103

Polyphenyleneoxide compositions were prepared in the same way as in Example 127, except that MQ was used instead of DOQ in the amounts shown in Table 47. In the same way as in Example 127, sheets were obtained, and the properties of both the composition and the sheets were evaluated. The results are shown in Table 47.

Examples 142–144 and Comparative Examples 104 and 105

Polyphenyleneoxide compositions were prepared in the same way as in Example 130, except that MQ was used instead of DOQ in the amounts shown in Table 48. In the same way as in Example 127, sheets were obtained, and the properties of both the composition and the sheets were evaluated. The results are shown in Table 48.

TABLE 1

|  | Examples | | | Comparative Examples | | |
| --- | --- | --- | --- | --- | --- | --- |
|  | 1 | 2 | 3 | 1 | 2 | 3 |
| Amount of DHQ (parts by weight) | 1 | 5 | 10 | 0 | 0.05 | 20 |
| Physical properties |  |  |  |  |  |  |
| Melt viscosity ($\times 10^3$ poise) (at 340° C.) | 8.2 | 6.3 | 3.9 | 12.0 | 11.0 | 2.8 |
| Tensile modulus ($\times 10^4$ kg/cm²) | 3.0 | 3.2 | 3.1 | 3.1 | 3.1 | 3.0 |
| Tensile strength (kg/cm²) | 1070 | 1100 | 1120 | 1080 | 1070 | 840 |
| Elongation at rupture (%) | 62 | 56 | 53 | 63 | 60 | 32 |
| Deflection temperature (°C.) | 199 | 198 | 197 | 200 | 200 | 181 |

DHQ: 4,4'''-Dihydroxy-p-quaterphenyl

TABLE 2

|  | Examples | | | Comparative Examples | |
| --- | --- | --- | --- | --- | --- |
|  | 4 | 5 | 6 | 4 | 5 |
| Amount of DHEQ (parts by weight) | 1 | 5 | 10 | 0 | 20 |
| Physical properties |  |  |  |  |  |
| Melt viscosity ($\times 10^3$ poise) (at 400° C.) | 1.02 | 0.46 | 0.21 | 1.60 | 0.19 |
| Tensile strength (kg/cm²) | 1100 | 1070 | 1060 | 1070 | 850 |
| Deflection temperature (°C.) | 200 | 199 | 197 | 201 | 183 |

DHEQ: 4,4'''-Di(2-hydroxyethoxy)-p-quaterphenyl

TABLE 3

| | Examples | | | Comparative Examples | |
|---|---|---|---|---|---|
| | 7 | 8 | 9 | 6 | 7 |
| Amount of DAEQ (parts by weight) | 1 | 5 | 10 | 0.05 | 20 |
| Physical properties | | | | | |
| Melt viscosity ($\times 10^3$ poise) (at 340° C.) | 7.9 | 6.6 | 3.2 | 11.0 | 3.0 |
| Tensile modulus ($\times 10^4$ kg/cm$^2$) | 3.0 | 3.1 | 3.2 | 3.1 | 3.0 |
| Tensile strength (kg/cm$^2$) | 1090 | 1060 | 1100 | 1070 | 790 |
| Elongation at rupture (%) | 61 | 59 | 50 | 61 | 27 |
| Deflection temperature (°C.) | 200 | 199 | 196 | 200 | 185 |

DAEQ: 4,4'''-Di(2-acetoxyethoxy)-p-quaterphenyl

TABLE 4

| | Examples | | | Comparative Examples | |
|---|---|---|---|---|---|
| | 10 | 11 | 12 | 8 | 9 |
| Amount of DMQ (parts by weight) | 0.5 | 3 | 10 | 0.05 | 20 |
| Physical properties | | | | | |
| Melt viscosity ($\times 10^3$ poise) (at 340° C.) | 9.0 | 6.2 | 3.2 | 11.0 | 3.1 |
| Tensile modulus ($\times 10^4$ kg/cm$^2$) | 3.1 | 3.3 | 3.2 | 3.0 | 3.2 |
| Tensile strength (kg/cm$^2$) | 1080 | 1090 | 1100 | 1080 | 820 |
| Elongation at rupture (%) | 62 | 61 | 60 | 63 | 49 |
| Deflection temperature (°C.) | 200 | 199 | 197 | 200 | 190 |

DMQ: 4,4'''-Dimethoxy-p-quaterphenyl

TABLE 5

| | Examples | | | Comparative Examples | |
|---|---|---|---|---|---|
| | 13 | 14 | 15 | 10 | 11 |
| Amount of DBQ (parts by weight) | 1 | 5 | 10 | 0.05 | 20 |
| Physical properties | | | | | |
| Melt viscosity ($\times 10^3$ poise) (at 340° C.) | 8.0 | 5.9 | 3.5 | 11.0 | 2.8 |
| Tensile modulus ($\times 10^4$ kg/cm$^2$) | 3.0 | 3.2 | 3.0 | 3.0 | 3.0 |
| Tensile strength (kg/cm$^2$) | 1070 | 1100 | 1090 | 1070 | 820 |
| Elongation at rupture (%) | 62 | 56 | 52 | 60 | 11 |
| Deflection temperature (°C.) | 199 | 199 | 198 | 200 | 190 |

DBQ: 4,4'''-Dibutoxy-p-quaterphenyl

TABLE 6

| | Examples | | | Comparative Examples | |
|---|---|---|---|---|---|
| | 16 | 17 | 18 | 12 | 13 |
| Amount of HEQ (parts by weight) | 1 | 5 | 10 | 0.05 | 20 |
| Physical properties | | | | | |
| Melt viscosity ($\times 10^3$ poise) (at 340° C.) | 8.8 | 7.9 | 4.4 | 11.0 | 3.1 |
| Tensile modulus ($\times 10^4$ kg/cm$^2$) | 3.0 | 3.0 | 3.0 | 3.1 | 2.9 |
| Tensile strength (kg/cm$^2$) | 1070 | 1090 | 1090 | 1060 | 830 |

TABLE 6-continued

|  | Examples | | | Comparative Examples | |
|---|---|---|---|---|---|
|  | 16 | 17 | 18 | 12 | 13 |
| Elongation at rupture (%) | 61 | 55 | 53 | 60 | 20 |
| Deflection temperature (°C.) | 198 | 198 | 196 | 200 | 191 |

HEQ: 4-(2-Hydroxyethoxy)-p-quaterphenyl

TABLE 7

|  | Examples | | | Comparative Examples | |
|---|---|---|---|---|---|
|  | 19 | 20 | 21 | 14 | 15 |
| Amount of Q (parts by weight) | 0.5 | 3 | 10 | 0.05 | 20 |
| Physical properties | | | | | |
| Melt viscosity (× 10³ poise) (at 400° C.) | 1.1 | 0.7 | 0.3 | 1.6 | 0.3 |
| Tensile modulus (× 10⁴ kg/cm²) | 3.0 | 3.2 | 3.1 | 3.1 | 3.0 |
| Tensile strength (kg/cm²) | 1090 | 1090 | 1100 | 1090 | 790 |
| Elongation at rupture (%) | 62 | 61 | 59 | 63 | 45 |
| Deflection temperature (°C.) | 199 | 198 | 196 | 200 | 187 |

Q: p-Quaterphenyl

TABLE 8

|  | Examples | | | Comparative Examples | | |
|---|---|---|---|---|---|---|
|  | 22 | 23 | 24 | 16 | 17 | 18 |
| Amount of DHQ (parts by weight) | 1 | 5 | 10 | 0 | 0.05 | 20 |
| Physical properties | | | | | | |
| Melt viscosity (× 10³ poise) (at 360° C.) | 1.5 | 1.0 | 0.7 | 2.3 | 2.2 | 0.7 |
| Tensile modulus (× 10⁴ kg/cm²) | 3.4 | 3.4 | 3.5 | 3.4 | 3.4 | 3.5 |
| Tensile strength (kg/cm²) | 970 | 980 | 960 | 960 | 970 | 670 |
| Elongation at rupture (%) | 69 | 65 | 56 | 73 | 70 | 10 |
| Deflection temperature (°C.) | 150 | 148 | 148 | 151 | 151 | 139 |

DHQ: 4,4'''-Dihydroxy-p-quaterphenyl

TABLE 9

|  | Examples | | | Comparative Example |
|---|---|---|---|---|
|  | 25 | 26 | 27 | 19 |
| Amount of DHEQ (parts by weight) | 1 | 5 | 10 | 20 |
| Physical properties | | | | |
| Melt viscosity (× 10³ poise) (at 360° C.) | 1.00 | 0.98 | 0.65 | 0.62 |
| Tensile strength (kg/cm²) | 980 | 970 | 970 | 710 |
| Deflection temperature (°C.) | 149 | 149 | 147 | 138 |

DHEQ: 4,4'''-Di(2-hydroxyethoxy)-p-quaterphenyl

TABLE 10

|  | Examples | | | Comparative Examples | |
|---|---|---|---|---|---|
|  | 28 | 29 | 30 | 20 | 21 |
| Amount of DAEQ (parts by weight) | 1 | 5 | 10 | 0.05 | 20 |
| Physical properties | | | | | |
| Melt viscosity (× 10³ poise) (at 360° C.) | 1.6 | 1.2 | 0.8 | 2.2 | 0.7 |
| Tensile modulus (× 10⁴ kg/cm²) | 3.4 | 3.4 | 3.5 | 3.4 | 3.5 |
| Tensile strength (kg/cm²) | 970 | 960 | 950 | 970 | 680 |
| Elongation at rupture (%) | 68 | 64 | 63 | 70 | 29 |
| Deflection temperature (°C.) | 150 | 148 | 147 | 151 | 138 |

DAEQ: 4,4'''-Di(2-acetoxyethoxy)-p-quaterphenyl

TABLE 11

|  | Examples | | | Comparative Examples | |
|---|---|---|---|---|---|
|  | 31 | 32 | 33 | 22 | 23 |
| Amount of DEQ (parts by weight) | 0.5 | 3 | 10 | 0.05 | 20 |
| Physical properties |  |  |  |  |  |
| Melt viscosity ($\times 10^3$ poise) (at 360° C.) | 1.7 | 1.1 | 0.7 | 2.2 | 0.7 |
| Tensile modulus ($\times 10^4$ kg/cm$^2$) | 3.4 | 3.5 | 3.5 | 3.5 | 3.3 |
| Tensile strength (kg/cm$^2$) | 970 | 980 | 980 | 960 | 810 |
| Elongation at rupture (%) | 71 | 71 | 69 | 72 | 25 |
| Deflection temperature (°C.) | 151 | 150 | 148 | 151 | 139 |

DEQ: 4,4'''-Diethoxy-p-quaterphenyl

TABLE 12

|  | Examples | | | Comparative Examples | |
|---|---|---|---|---|---|
|  | 34 | 35 | 36 | 24 | 25 |
| Amount of DBQ (parts by weight) | 1 | 5 | 10 | 0.05 | 20 |
| Physical properties |  |  |  |  |  |
| Melt viscosity ($\times 10^3$ poise) (at 360° C.) | 1.3 | 1.0 | 0.7 | 2.2 | 0.7 |
| Tensile modulus ($\times 10^4$ kg/cm$^2$) | 3.5 | 3.4 | 3.4 | 3.4 | 3.5 |
| Tensile strength (kg/cm$^2$) | 970 | 980 | 960 | 970 | 970 |
| Elongation at rupture (%) | 69 | 65 | 57 | 70 | 21 |
| Deflection temperature (°C.) | 150 | 150 | 149 | 151 | 140 |

DBQ: 4,4'''-Dibutoxy-p-quaterphenyl

TABLE 13

|  |  | Examples | | | Comparative Examples | |
|---|---|---|---|---|---|---|
|  |  | 37 | 38 | 39 | 26 | 27 |
| Amount of HQ (parts by weight) |  | 1 | 5 | 10 | 0.05 | 20 |
| Physical properties | Melt viscosity ($\times 10^3$ poise) (at 360° C.) | 1.9 | 1.1 | 0.9 | 2.2 | 0.7 |
|  | Tensile modulus ($\times 10^4$ kg/cm$^2$) | 3.4 | 3.4 | 3.3 | 3.4 | 3.4 |
|  | Tensile strength (kg/cm$^2$) | 970 | 970 | 950 | 960 | 620 |
|  | Elongation at rupture (%) | 65 | 60 | 55 | 70 | 12 |
|  | Deflection temperature (°C.) | 150 | 150 | 149 | 151 | 140 |

HQ: 4-Hydroxy-p-quaterphenyl

TABLE 14

|  |  | Examples | | | Comparative Examples | | |
|---|---|---|---|---|---|---|---|
|  |  | 40 | 41 | 42 | 28 | 29 | 30 |
| Amount of DHQ (parts by weight) |  | 1 | 5 | 10 | 0 | 0.05 | 20 |
| Physical properties | Melt viscosity ($\times 10^3$ poise) (at 350° C.) | 5.1 | 3.9 | 2.5 | 6.3 | 6.2 | 2.3 |
|  | Tensile modulus ($\times 10^4$ kg/cm$^2$) | 1.4 | 1.5 | 1.5 | 1.4 | 1.4 | 1.5 |
|  | Tensile strength (kg/cm$^2$) | 850 | 840 | 830 | 840 | 840 | 500 |
|  | Elongation at rupture (%) | 63 | 60 | 57 | 65 | 66 | 10 |
|  | Deflection temperature (°C.) | 200 | 200 | 199 | 201 | 201 | 188 |

DHQ: 4,4'''-Dihydroxy-p-quaterphenyl

TABLE 15

|  |  | Examples | | | Comparative Examples | |
|---|---|---|---|---|---|---|
|  |  | 43 | 44 | 45 | 31 | 32 |
| Amount of DAQ (parts by weight) |  | 0.5 | 3 | 10 | 0.05 | 20 |
| Physical properties | Melt viscosity ($\times 10^3$ poise) (at 350° C.) | 5.0 | 3.5 | 2.0 | 6.2 | 1.8 |
|  | Tensile modulus ($\times 10^4$ kg/cm$^2$) | 1.4 | 1.5 | 1.5 | 1.4 | 1.3 |
|  | Tensile strength (kg/cm$^2$) | 840 | 850 | 840 | 830 | 560 |
|  | Elongation at rupture (%) | 64 | 62 | 60 | 64 | 32 |
|  | Deflection temperature (°C.) | 201 | 200 | 197 | 201 | 190 |

DAQ: 4,4'''-Diacetoxy-p-quaterphenyl

TABLE 16

|  |  | Examples | | | Comparative Examples | |
|---|---|---|---|---|---|---|
|  |  | 46 | 47 | 48 | 33 | 34 |
| Amount of DHEQ (parts by weight) |  | 1 | 5 | 10 | 0.05 | 20 |
| Physical properties | Melt viscosity ($\times 10^3$ poise) (at 350° C.) | 4.5 | 3.2 | 3.0 | 6.2 | 2.5 |
|  | Tensile modulus ($\times 10^4$ kg/cm$^2$) | 1.4 | 1.4 | 1.3 | 1.4 | 1.3 |
|  | Tensile strength (kg/cm$^2$) | 840 | 840 | 830 | 840 | 480 |
|  | Elongation at rupture (%) | 64 | 62 | 56 | 65 | 12 |
|  | Deflection temperature (°C.) | 200 | 199 | 198 | 201 | 189 |

DHEQ: 4,4'''-Di(2-hydroxyethoxy)-p-quaterphenyl

TABLE 17

|  |  | Examples | | | Comparative Examples | |
|---|---|---|---|---|---|---|
|  |  | 49 | 50 | 51 | 35 | 36 |
| Amount of DAEQ (parts by weight) |  | 1 | 5 | 10 | 0.05 | 20 |
| Physical properties | Melt viscosity ($\times 10^3$ poise) (at 350° C.) | 4.8 | 3.6 | 2.7 | 6.1 | 2.4 |
|  | Tensile modulus ($\times 10^4$ kg/cm$^2$) | 1.4 | 1.4 | 1.5 | 1.4 | 1.5 |
|  | Tensile strength (kg/cm$^2$) | 830 | 850 | 860 | 840 | 520 |
|  | Elongation at rupture (%) | 66 | 63 | 55 | 67 | 13 |
|  | Deflection temperature (°C.) | 201 | 198 | 197 | 201 | 190 |

DAEQ: 4,4'''-Di(2-acetoxyethoxy)-p-quaterphenyl

TABLE 18

|  | Examples | | | Comparative Examples | |
|---|---|---|---|---|---|
|  | 52 | 53 | 54 | 37 | 38 |
| Amount of DBQ (parts by weight) | 1 | 5 | 10 | 0.05 | 20 |

TABLE 18-continued

|  |  | Examples | | | Comparative Examples | |
|---|---|---|---|---|---|---|
|  |  | 52 | 53 | 54 | 37 | 38 |
| Physical properties | Melt viscosity ($\times 10^3$ poise) (at 350° C.) | 4.8 | 3.2 | 2.1 | 6.2 | 2.0 |
|  | Tensile modulus ($\times 10^4$ kg/cm$^2$) | 1.4 | 1.5 | 1.4 | 1.4 | 1.5 |
|  | Tensile strength (kg/cm$^2$) | 850 | 840 | 840 | 840 | 520 |
|  | Elongation at rupture (%) | 63 | 60 | 55 | 66 | 22 |
|  | Deflection temperature (°C.) | 200 | 200 | 199 | 201 | 191 |

DBQ: 4,4'''-Dibutoxy-p-quaterphenyl

TABLE 19

|  |  | Examples | | | Comparative Examples | |
|---|---|---|---|---|---|---|
|  |  | 55 | 56 | 57 | 39 | 40 |
| Amount of HQ (parts by weight) | | 1 | 5 | 10 | 0.05 | 20 |
| Physical properties | Melt viscosity ($\times 10^3$ poise) (at 350° C.) | 5.0 | 4.3 | 2.7 | 6.3 | 2.5 |
|  | Tensile modulus ($\times 10^4$ kg/cm$^2$) | 1.4 | 1.4 | 1.3 | 1.4 | 1.2 |
|  | Tensile strength (kg/cm$^2$) | 840 | 840 | 830 | 830 | 500 |
|  | Elongation at rupture (%) | 60 | 60 | 58 | 65 | 10 |
|  | Deflection temperature (°C.) | 201 | 200 | 197 | 201 | 193 |

HQ: 4-Hydroxy-p-quaterphenyl

TABLE 20

|  |  | Examples | | | Comparative Example |
|---|---|---|---|---|---|
|  |  | 58 | 59 | 60 | 41 |
| Amount (parts by weight) | DHQ | 5 | 0 | 0 | 0 |
|  | DAEQ | 0 | 5 | 0 | 0 |
|  | DBQ | 0 | 0 | 5 | 0 |
| Physical properties | Melt viscosity ($\times 10^3$ poise) (at 350° C.) | 6.3 | 6.5 | 6.1 | 12.0 |
|  | Tensile modulus ($\times 10^4$ kg/cm$^2$) | 2.4 | 2.4 | 2.3 | 2.4 |
|  | Tensile strength (kg/cm$^2$) | 730 | 740 | 730 | 730 |
|  | Elongation at rupture (%) | 72 | 73 | 73 | 76 |
|  | Deflection temperature (°C.) | 174 | 174 | 175 | 176 |

DHQ: 4,4'''-Dihydroxy-p-quaterphenyl
DAEQ: 4,4'''-Di(2-acetoxyethoxy)-p-quaterphenyl
DBQ: 4,4'''-Dibutoxy-p-quaterphenyl

TABLE 21

|  |  | Examples | | | Comparative Examples | | |
|---|---|---|---|---|---|---|---|
|  |  | 61 | 62 | 63 | 42 | 43 | 44 |
| Amount of DHQ (parts by weight) | | 1 | 5 | 10 | 0 | 0.05 | 20 |
| Physical properties | Melt viscosity ($\times 10^2$ poise) (at 340° C.) | 5.8 | 4.6 | 2.8 | 8.4 | 8.2 | 2.5 |
|  | Tensile modulus ($\times 10^4$ kg/cm$^2$) | 2.4 | 2.5 | 2.4 | 2.4 | 2.5 | 2.5 |
|  | Tensile strength (kg/cm$^2$) | 540 | 540 | 530 | 540 | 530 | 360 |
|  | Elongation at rupture (%) | 5.0 | 4.8 | 4.7 | 5.2 | 5.1 | 3.1 |
|  | Deflection temperature (°C.) | 104 | 103 | 102 | 105 | 105 | 92 |

DHQ: 4,4'''-Dihydroxy-p-quaterphenyl

TABLE 22

|  |  | Examples | | | Comparative Examples | |
|---|---|---|---|---|---|---|
|  |  | 64 | 65 | 66 | 45 | 46 |
| Amount of DHEQ (parts by weight) | | 1 | 5 | 10 | 0.05 | 20 |
| Physical properties | Melt viscosity ($\times 10^2$ poise) (at 340° C.) | 6.0 | 5.5 | 3.1 | 8.3 | 2.8 |
|  | Tensile modulus ($\times 10^4$ kg/cm$^2$) | 2.4 | 2.4 | 2.4 | 2.4 | 2.3 |
|  | Tensile strength (kg/cm$^2$) | 540 | 530 | 520 | 540 | 310 |
|  | Elongation at rupture (%) | 5.1 | 4.8 | 4.6 | 5.2 | 2.8 |
|  | Deflection temperature (°C.) | 104 | 103 | 102 | 105 | 91 |

DHEQ: 4,4'''-Di(2-hydroxyethoxy)-p-quaterphenyl

TABLE 23

|  |  | Examples | | | Comparative Examples | |
|---|---|---|---|---|---|---|
|  |  | 67 | 68 | 69 | 47 | 48 |
| Amount of DAEQ (parts by weight) | | 1 | 5 | 10 | 0.05 | 20 |
| Physical properties | Melt viscosity ($\times 10^2$ poise) (at 340° C.) | 5.5 | 4.3 | 2.5 | 8.2 | 2.5 |
|  | Tensile modulus ($\times 10^4$ kg/cm$^2$) | 2.4 | 2.5 | 2.4 | 2.5 | 2.5 |
|  | Tensile strength (kg/cm$^2$) | 540 | 540 | 550 | 530 | 330 |
|  | Elongation at rupture (%) | 5.0 | 4.8 | 4.7 | 5.1 | 3.1 |
|  | Deflection temperature (°C.) | 104 | 103 | 102 | 105 | 91 |

DAEQ: 4,4'''-Di(2-acetoxyethoxy)-p-quaterphenyl

TABLE 24

|  |  | Examples | | | Comparative Examples | |
|---|---|---|---|---|---|---|
|  |  | 70 | 71 | 72 | 49 | 50 |
| Amount of DBQ (parts by weight) | | 1 | 5 | 10 | 0.05 | 20 |
| Physical properties | Melt viscosity ($\times 10^2$ poise) (at 340° C.) | 5.4 | 4.1 | 2.5 | 8.2 | 2.4 |
|  | Tensile modulus ($\times 10^4$ kg/cm$^2$) | 2.3 | 2.5 | 2.5 | 2.5 | 2.5 |
|  | Tensile strength (kg/cm$^2$) | 540 | 530 | 540 | 530 | 340 |
|  | Elongation at rupture (%) | 4.9 | 4.7 | 4.6 | 5.1 | 2.9 |
|  | Deflection temperature (°C.) | 104 | 102 | 101 | 105 | 89 |

DBQ: 4,4'''-Dibutoxy-p-quaterphenyl

TABLE 25

|  |  | Examples | | | Comparative Examples | |
|---|---|---|---|---|---|---|
|  |  | 73 | 74 | 75 | 51 | 52 |
| Amount of HQ (parts by weight) | | 1 | 5 | 10 | 0.05 | 20 |
| Physical properties | Melt viscosity ($\times 10^2$ poise) | 5.4 | 3.9 | 2.6 | 8.2 | 2.0 |

TABLE 25-continued

|  |  | Examples | | | Comparative Examples | |
|---|---|---|---|---|---|---|
|  |  | 73 | 74 | 75 | 51 | 52 |
|  | (at 340° C.) | | | | | |
|  | Tensile modulus ($\times 10^4$ kg/cm$^2$) | 2.4 | 2.4 | 2.4 | 2.3 | 2.4 |
|  | Tensile strength (kg/cm$^2$) | 530 | 530 | 540 | 530 | 320 |
|  | Elongation at rupture (%) | 4.9 | 4.7 | 4.6 | 5.0 | 2.0 |
|  | Deflection temperature (°C.) | 103 | 103 | 100 | 105 | 90 |

HQ: 4-Hydroxy-p-quaterphenyl

TABLE 26

|  |  | Examples | | | Comparative Examples | | |
|---|---|---|---|---|---|---|---|
|  |  | 76 | 77 | 78 | 53 | 54 | 55 |
|  | Amount of DHQ (parts by weight) | 1 | 5 | 10 | 0 | 0.05 | 20 |
| Physical properties | Melt viscosity ($\times 10^3$ poise) (at 360° C.) | 2.6 | 1.5 | 0.8 | 4.5 | 4.5 | 0.7 |
|  | Tensile modulus ($\times 10^4$ kg/cm$^2$) | 2.2 | 2.2 | 2.1 | 2.2 | 2.2 | 2.0 |
|  | Tensile strength (kg/cm$^2$) | 730 | 740 | 700 | 710 | 720 | 470 |
|  | Elongation at rupture (%) | 59 | 57 | 50 | 55 | 56 | 21 |
|  | Deflection temperature (°C.) | 174 | 173 | 173 | 175 | 175 | 170 |

DHQ: 4,4'''-Dihydroxy-p-quaterphenyl

TABLE 27

|  |  | Examples | | | Comparative Examples | |
|---|---|---|---|---|---|---|
|  |  | 79 | 80 | 81 | 56 | 57 |
|  | Amount of DAEQ (parts by weight) | 1 | 5 | 10 | 0.05 | 20 |
| Physical properties | Melt viscosity ($\times 10^3$ poise) (at 360° C.) | 2.7 | 1.8 | 0.8 | 4.6 | 0.8 |
|  | Tensile modulus ($\times 10^4$ kg/cm$^2$) | 2.2 | 2.2 | 2.1 | 2.1 | 2.0 |
|  | Tensile strength (kg/cm$^2$) | 720 | 740 | 700 | 720 | 470 |
|  | Elongation at rupture (%) | 54 | 55 | 50 | 56 | 21 |
|  | Deflection temperature (°C.) | 174 | 173 | 172 | 175 | 169 |

DAEQ: 4,4'''-Di(2-acetoxyethoxy)-p-quaterphenyl

TABLE 28

|  |  | Examples | | | Comparative Examples | |
|---|---|---|---|---|---|---|
|  |  | 82 | 83 | 84 | 58 | 59 |
|  | Amount of DBQ (parts by weight) | 1 | 5 | 10 | 0.05 | 20 |
| Physical properties | Melt viscosity ($\times 10^3$ poise) (at 360° C.) | 2.2 | 1.1 | 0.8 | 4.5 | 0.7 |
|  | Tensile modulus ($\times 10^4$ kg/cm$^2$) | 2.2 | 2.1 | 2.1 | 2.2 | 2.0 |
|  | Tensile strength (kg/cm$^2$) | 700 | 720 | 700 | 720 | 460 |
|  | Elongation at rupture (%) | 56 | 53 | 50 | 56 | 23 |
|  | Deflection temperature (°C.) | 173 | 171 | 171 | 175 | 162 |

DBQ: 4,4'''-Dibutoxy-p-quaterphenyl

TABLE 29

|  |  | Examples | | | Comparative Examples | |
|---|---|---|---|---|---|---|
|  |  | 85 | 86 | 87 | 60 | 61 |
|  | Amount of DHPQ (parts by weight) | 0.5 | 3 | 10 | 0.05 | 20 |
| Physical properties | Melt viscosity ($\times 10^3$ poise) (at 360° C.) | 3.1 | 2.1 | 0.8 | 4.6 | 0.8 |
|  | Tensile modulus ($\times 10^4$ kg/cm$^2$) | 2.2 | 2.3 | 2.3 | 2.1 | 2.0 |
|  | Tensile strength (kg/cm$^2$) | 720 | 730 | 720 | 710 | 510 |
|  | Elongation at rupture (%) | 54 | 54 | 51 | 55 | 28 |
|  | Deflection temperature (°C.) | 173 | 173 | 172 | 175 | 165 |

DHPQ: 4,4'''-Diheptyloxy-p-quaterphenyl

TABLE 30

|  |  | Examples | | | Comparative Examples | |
|---|---|---|---|---|---|---|
|  |  | 88 | 89 | 90 | 62 | 63 |
|  | Amount of HEQ (parts by weight) | 1 | 5 | 10 | 0.05 | 20 |
| Physical properties | Melt viscosity ($\times 10^3$ poise) (at 360° C.) | 2.6 | 1.4 | 0.8 | 4.5 | 0.7 |
|  | Tensile modulus ($\times 10^4$ kg/cm$^2$) | 2.2 | 2.2 | 2.1 | 2.2 | 2.1 |
|  | Tensile strength (kg/cm$^2$) | 720 | 730 | 710 | 710 | 460 |
|  | Elongation at rupture (%) | 58 | 58 | 55 | 55 | 22 |
|  | Deflection temperature (°C.) | 174 | 174 | 173 | 175 | 171 |

HEQ: 4-(2-Hydroxyethoxy)-p-quaterphenyl

TABLE 31

|  |  | Examples | | | Comparative Examples | | |
|---|---|---|---|---|---|---|---|
|  |  | 91 | 92 | 93 | 64 | 65 | 66 |
|  | Amount of DHQ (parts by weight) | 1 | 5 | 10 | 0 | 0.05 | 20 |
| Physical properties | Melt viscosity ($\times 10^3$ poise) (at 380° C.) | 6.2 | 4.1 | 1.9 | 8.8 | 8.5 | 1.7 |
|  | Tensile modulus ($\times 10^4$ kg/cm$^2$) | 3.1 | 3.0 | 2.9 | 3.0 | 3.0 | 2.9 |
|  | Tensile strength (kg/cm$^2$) | 760 | 750 | 750 | 750 | 760 | 620 |
|  | Elongation at rupture (%) | 6 | 5 | 5 | 6 | 6 | 2 |
|  | Deflection temperature (°C.) | 293 | 291 | 290 | 293 | 293 | 282 |

DHQ: 4,4'''-Dihydroxy-p-quaterphenyl

TABLE 32

|  |  | Examples | | | Comparative Examples | |
|---|---|---|---|---|---|---|
|  |  | 94 | 95 | 96 | 67 | 68 |
|  | Amount of DOQ (parts by weight) | 0.5 | 3 | 10 | 0.05 | 20 |
| Physical properties | Melt viscosity ($\times 10^3$ poise) (at 380° C.) | 6.6 | 5.1 | 1.8 | 8.6 | 1.6 |
|  | Tensile modulus ($\times 10^4$ kg/cm$^2$) | 3.1 | 3.2 | 3.1 | 3.0 | 3.1 |
|  | Tensile strength (kg/cm$^2$) | 760 | 750 | 770 | 750 | 640 |
|  | Elongation at rupture (%) | 5 | 5 | 5 | 6 | 2 |
|  | Deflection | 293 | 292 | 290 | 293 | 281 |

TABLE 32-continued

|  | Examples | | | Comparative Examples | |
|---|---|---|---|---|---|
|  | 94 | 95 | 96 | 67 | 68 |
| temperature (°C.) | | | | | |

DOQ: 4,4'''-Dioctyloxy-p-quaterphenyl

TABLE 33

|  |  | Examples | | | Comparative Examples | |
|---|---|---|---|---|---|---|
|  |  | 97 | 98 | 99 | 69 | 70 |
|  | Amount of HEQ (parts by weight) | 1 | 5 | 10 | 0.05 | 20 |
| Physical properties | Melt viscosity ($\times 10^3$ poise) (at 380° C.) | 6.4 | 4.0 | 1.9 | 8.6 | 1.8 |
|  | Tensile modulus ($\times 10^4$ kg/cm$^2$) | 3.0 | 3.0 | 2.9 | 2.9 | 2.9 |
|  | Tensile strength (kg/cm$^2$) | 750 | 750 | 750 | 750 | 620 |
|  | Elongation at rupture (%) | 6 | 5 | 5 | 6 | 3 |
|  | Deflection temperature (°C.) | 292 | 290 | 290 | 293 | 283 |

HEQ: 4-(2-Hydroxyethoxy)-p-quaterphenyl

TABLE 34

|  |  | Examples | | | Comparative Examples | | |
|---|---|---|---|---|---|---|---|
|  |  | 100 | 101 | 102 | 71 | 72 | 73 |
|  | Amount of DHQ (parts by weight) | 1 | 5 | 10 | 0 | 0.05 | 20 |
| Physical properties | Spiral flow (cm) | 12.3 | 18.2 | 28.7 | 9.5 | 9.7 | 30.2 |
|  | Tensile modulus ($\times 10^4$ kg/cm$^2$) | 5.0 | 4.9 | 4.9 | 5.1 | 5.1 | 3.8 |
|  | Tensile strength (kg/cm$^2$) | 1850 | 1870 | 1880 | 1900 | 1900 | 1520 |
|  | Elongation at rupture (%) | 11 | 10 | 10 | 12 | 12 | 5 |
|  | Deflection temperature (°C.) | 272 | 270 | 269 | 274 | 274 | 258 |

DHQ: 4,4'''-Dihydroxy-p-quaterphenyl

TABLE 35

|  |  | Examples | | | Comparative Examples | |
|---|---|---|---|---|---|---|
|  |  | 103 | 104 | 105 | 74 | 75 |
|  | (Amount of DPQ) (parts by weight) | 0.5 | 3 | 10 | 0.05 | 20 |
| Physical properties | Spiral flow (cm) | 11.5 | 16.5 | 28.5 | 9.6 | 29.1 |
|  | Tensile modulus ($\times 10^4$ kg/cm$^2$) | 5.1 | 5.2 | 5.2 | 5.1 | 4.8 |
|  | Tensile strength (kg/cm$^2$) | 1900 | 1910 | 1910 | 1900 | 1600 |
|  | Elongation at rupture (%) | 11 | 11 | 10 | 12 | 6 |
|  | Deflection temperature (°C.) | 274 | 272 | 271 | 274 | 259 |

DPQ: 4,4'''-Dipropoxy-p-quaterphenyl

TABLE 36

|  |  | Examples | | | Comparative Examples | |
|---|---|---|---|---|---|---|
|  |  | 106 | 107 | 108 | 76 | 77 |
| Amount of MQ (parts by weight) | | 1 | 5 | 10 | 0.05 | 20 |
| Physical properties | Spiral flow (cm) | 13.0 | 19.1 | 27.5 | 9.6 | 30.0 |
|  | Tensile modulus ($\times 10^4$ kg/cm$^2$) | 5.0 | 4.9 | 4.9 | 5.0 | 4.0 |
|  | Tensile strength (kg/cm$^2$) | 1860 | 1850 | 1850 | 1800 | 1500 |
|  | Elongation at rupture (%) | 11 | 10 | 10 | 11 | 4 |
|  | Deflection temperature (°C.) | 273 | 271 | 270 | 274 | 255 |

MQ: 4-Methoxy-p-quaterphenyl

TABLE 37

|  |  | Examples | | | Comparative Examples | | |
|---|---|---|---|---|---|---|---|
|  |  | 109 | 110 | 111 | 78 | 79 | 80 |
| Amount of DHQ (parts by weight) | | 1 | 4 | 7 | 0 | 0.03 | 20 |
| Physical properties | Melt viscosity ($\times 10^3$ poise) (at 300° C.) | 0.7 | 0.5 | 0.3 | 1.1 | 1.1 | 0.3 |
|  | Tensile modulus ($\times 10^4$ kg/cm$^2$) | 1.8 | 1.8 | 1.7 | 1.9 | 1.9 | 1.3 |
|  | Tensile strength (kg/cm$^2$) | 610 | 600 | 610 | 620 | 620 | 480 |
|  | Elongation at rupture (%) | 135 | 130 | 130 | 140 | 138 | 95 |
|  | Deflection temperature (°C.) | 128 | 127 | 126 | 129 | 129 | 107 |
|  | Double refraction (nm) | 20 | 12 | 9 | 26 | 25 | — |
|  | Light transmission (%) | 88 | 86 | 84 | 91 | 90 | 65 |

DHQ: 4,4'''-Dihydroxy-p-quaterphenyl

TABLE 38

|  |  | Examples | | | Comparative Examples | | |
|---|---|---|---|---|---|---|---|
|  |  | 112 | 113 | 114 | 81 | 82 | 83 |
| Composition | Polycarbonate | 70 | 70 | 70 | 70 | 70 | 70 |
|  | Glass fibers | 30 | 30 | 30 | 30 | 30 | 30 |
|  | DHQ | 1 | 4 | 7 | 0 | 0.03 | 14 |
| Physical properties | Melt viscosity ($\times 10^3$ poise) (at 260° C.) | 6.2 | 0.8 | 0.4 | 26.0 | 25.0 | 0.3 |
|  | Tensile strength (kg/cm$^2$) | 1240 | 1200 | 1210 | 1250 | 1240 | 980 |
|  | Elongation at rupture (%) | 3 | 2 | 2 | 3 | 3 | 2 |
|  | Deflection temperature (°C.) | 146 | 144 | 143 | 147 | 147 | 126 |

DHQ: 4,4'''-Dihydroxy-p-quaterphenyl

TABLE 39

|  |  | Examples | | | Comparative Examples | |
|---|---|---|---|---|---|---|
|  |  | 115 | 116 | 117 | 84 | 85 |
| Amount of DDQ (parts by weight) | | 0.5 | 3 | 10 | 0.05 | 20 |
| Physical properties | Melt viscosity ($\times 10^2$ poise) (at 300° C.) | 8.2 | 6.1 | 2.9 | 10.0 | 2.8 |
|  | Tensile modulus ($\times 10^4$ kg/cm$^2$) | 1.9 | 1.8 | 2.0 | 1.9 | 1.9 |
|  | Tensile strength (kg/cm$^2$) | 620 | 630 | 640 | 620 | 620 |
|  | Elongation at rupture (%) | 136 | 135 | 132 | 140 | 95 |
|  | Deflection temperature (°C.) | 129 | 127 | 126 | 129 | 109 |
|  | Double refraction (nm) | 22 | 15 | 8 | 26 | — |
|  | Light transmission (%) | 90 | 87 | 85 | 91 | 67 |

DDQ: 4,4'''-Didodecyloxy-p-quaterphenyl

TABLE 40

| | | Examples | | | Comparative Examples | |
|---|---|---|---|---|---|---|
| | | 118 | 119 | 120 | 86 | 87 |
| Composition | Polycarbonate | 70 | 70 | 70 | 70 | 70 |
| | Glass fibers | 30 | 30 | 30 | 30 | 30 |
| | DDQ | 0.5 | 3 | 7 | 0.03 | 14 |
| Physical properties | Melt viscosity ($\times 10^3$ poise) (at 260° C.) | 11.0 | 3.2 | 0.4 | 25.0 | 0.4 |
| | Tensile strength (kg/cm$^2$) | 1250 | 1260 | 1270 | 1250 | 1010 |
| | Elongation at rupture (%) | 3 | 3 | 2 | 3 | 2 |
| | Deflection temperature (°C.) | 147 | 145 | 143 | 147 | 124 |

DDQ: 4,4'''-Didodecyloxy-p-quaterphenyl

TABLE 41

| | | Examples | | | Comparative Examples | |
|---|---|---|---|---|---|---|
| | | 121 | 122 | 123 | 88 | 89 |
| Amount of MQ (parts by weight) | | 1 | 5 | 10 | 0.05 | 20 |
| Physical properties | Melt viscosity ($\times 10^3$ poise) (at 300° C.) | 0.7 | 0.6 | 0.3 | 1.0 | 0.2 |
| | Tensile modulus ($\times 10^4$ kg/cm$^2$) | 1.9 | 1.8 | 1.8 | 1.9 | 1.5 |
| | Tensile strength (kg/cm$^2$) | 600 | 600 | 600 | 610 | 500 |
| | Elongation at rupture (%) | 135 | 130 | 130 | 135 | 90 |
| | Deflection temperature (°C.) | 129 | 128 | 125 | 129 | 110 |
| | Double refraction (nm) | 20 | 12 | 10 | 25 | — |
| | Light transmission (%) | 89 | 85 | 83 | 90 | 60 |

MQ: 4-Methoxy-p-quaterphenyl

TABLE 42

| | | Examples | | | Comparative Examples | |
|---|---|---|---|---|---|---|
| | | 124 | 125 | 126 | 90 | 91 |
| Composition | Polycarbonate | 70 | 70 | 70 | 70 | 70 |
| | Glass fibers | 30 | 30 | 30 | 30 | 30 |
| | MQ | 1 | 4 | 7 | 0.03 | 14 |
| Physical properties | Melt viscosity ($\times 10^3$ poise) (at 260° C.) | 6.0 | 0.8 | 0.4 | 25.0 | 0.5 |
| | Tensile strength (kg/cm$^2$) | 1230 | 1210 | 1200 | 1240 | 900 |
| | Elongation at rupture (%) | 2 | 2 | 2 | 3 | 1 |
| | Deflection temperature (°C.) | 145 | 145 | 143 | 147 | 125 |

MQ: 4-Methoxy-p-quaterphenyl

TABLE 43

| | | Examples | | | Comparative Examples | | |
|---|---|---|---|---|---|---|---|
| | | 127 | 128 | 129 | 92 | 93 | 94 |
| Amount of DOQ (parts by weight) | | 1 | 5 | 10 | 0 | 0.05 | 20 |
| Physical properties | Melt viscosity ($\times 10^3$ poise) (at 300° C.) | 6.1 | 3.9 | 3.0 | 7.5 | 7.4 | 2.9 |
| | Tensile modulus ($\times 10^4$ kg/cm$^2$) | 2.6 | 2.6 | 2.5 | 2.7 | 2.8 | 1.7 |
| | Tensile strength (kg/cm$^2$) | 780 | 770 | 770 | 790 | 790 | 610 |
| | Elongation at rupture (%) | 52 | 50 | 48 | 55 | 54 | 31 |
| | Deflection temperature (°C.) | 171 | 168 | 167 | 172 | 172 | 158 |

DOQ: 4,4'''-Dioctyloxy-p-quaterphenyl

TABLE 44

| | | Examples | | | Comparative Examples | | |
|---|---|---|---|---|---|---|---|
| | | 130 | 131 | 132 | 95 | 96 | 97 |
| Composition | Polyphenyleneoxide | 70 | 70 | 70 | 70 | 70 | 70 |
| | Glass fibers | 30 | 30 | 30 | 30 | 30 | 30 |
| | DOQ | 1 | 4 | 7 | 0 | 0.03 | 14 |
| Physical properties | Melt viscosity ($\times 10^3$ poise) (at 300° C.) | 5.2 | 3.8 | 2.9 | 6.3 | 6.2 | 2.9 |
| | Tensile strength (kg/cm$^2$) | 1210 | 1200 | 1200 | 1200 | 1210 | 970 |
| | Tensile modulus ($\times 10^4$ kg/cm$^2$) | 7.2 | 7.3 | 7.2 | 7.3 | 7.3 | 5.6 |
| | Elongation at rupture (%) | 5 | 4 | 4 | 6 | 3 | 2 |
| | Deflection temperature (°C.) | 141 | 140 | 140 | 142 | 142 | 121 |

DOQ: 4,4'''-Dioctyloxy-p-quaterphenyl

TABLE 45

| | | Examples | | | Comparative Examples | |
|---|---|---|---|---|---|---|
| | | 133 | 134 | 135 | 98 | 99 |
| Amount of DDQ (parts by weight) | | 0.5 | 3 | 10 | 0.05 | 20 |
| Physical Properties | Melt viscosity ($\times 10^3$ poise) (at 300° C.) | 6.8 | 4.5 | 2.9 | 7.4 | 2.8 |
| | Tensile strength (kg/cm$^2$) | 790 | 800 | 800 | 790 | 590 |
| | Tensile modulus ($\times 10^4$ kg/cm$^2$) | 2.6 | 2.7 | 2.7 | 2.7 | 2.7 |
| | Elongation at rupture (%) | 53 | 52 | 50 | 54 | 28 |
| | Deflection temperature (°C.) | 172 | 171 | 168 | 172 | 159 |

DDQ: 4,4'''-Didodecyloxy-p-quaterphenyl

TABLE 46

| | | Examples | | | Comparative Examples | |
|---|---|---|---|---|---|---|
| | | 136 | 137 | 138 | 100 | 101 |
| Composition | Polyphenyleneoxide | 70 | 70 | 70 | 70 | 70 |
| | Glass fibers | 30 | 30 | 30 | 30 | 30 |
| | DDQ | 0.5 | 3 | 7 | 0.03 | 14 |
| Physical properties | Melt viscosity ($\times 10^3$ poise) (at 300° C.) | 5.8 | 4.0 | 2.8 | 6.2 | 2.7 |
| | Tensile strength (kg/cm$^2$) | 1200 | 1210 | 1210 | 1200 | 950 |
| | Tensile modulus ($\times 10^4$ kg/cm$^2$) | 7.3 | 7.4 | 7.4 | 7.3 | 7.2 |
| | Elongation at rupture (%) | 6 | 5 | 5 | 6 | 2 |
| | Deflection temperature (°C.) | 142 | 141 | 140 | 142 | 125 |

DDQ: 4,4'''-Didodecyloxy-p-quaterphenyl

TABLE 47

| | Examples | | | Comparative Examples | |
|---|---|---|---|---|---|
| | 139 | 140 | 141 | 102 | 103 |
| Amount of MQ | 1 | 5 | 10 | 0.05 | 20 |

TABLE 47-continued

|  |  | Examples | | | Comparative Examples | |
|---|---|---|---|---|---|---|
|  |  | 139 | 140 | 141 | 102 | 103 |
| (parts by weight) | | | | | | |
| Physical properties | Melt viscosity (× 10³ poise) (at 300° C.) | 6.9 | 4.0 | 3.1 | 7.4 | 2.5 |
|  | Tensile strength (kg/cm²) | 790 | 780 | 780 | 790 | 620 |
|  | Tensile modulus (× 10⁴ kg/cm²) | 2.8 | 2.5 | 2.5 | 2.7 | 1.9 |
|  | Elongation at rupture (%) | 50 | 50 | 45 | 53 | 25 |
|  | Deflection temperature (°C.) | 170 | 167 | 167 | 172 | 155 |

MQ: 4-Methoxy-p-quaterphenyl

TABLE 48

|  |  | Examples | | | Comparative Examples | |
|---|---|---|---|---|---|---|
|  |  | 142 | 143 | 144 | 104 | 105 |
| Composition | Polyphenyleneoxide | 70 | 70 | 70 | 70 | 70 |
|  | Glass fibers | 30 | 30 | 30 | 30 | 30 |
|  | MQ | 1 | 4 | 7 | 0.03 | 14 |
| Physical properties | Melt viscosity (× 10³ poise) (at 300° C.) | 5.6 | 3.9 | 2.8 | 6.3 | 2.7 |
|  | Tensile strength (kg/cm²) | 1200 | 1200 | 1180 | 1200 | 990 |
|  | Tensile modulus (× 10⁴ kg/cm²) | 7.3 | 7.3 | 7.2 | 7.3 | 5.9 |
|  | Elongation at rupture (%) | 5 | 4 | 4 | 4 | 1 |
|  | Deflection temperature (°C.) | 141 | 140 | 140 | 142 | 131 |

MQ: 4-Methoxy-p-quaterphenyl

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

We claim:

1. An engineering plastic composition comprising an engineering plastic material, wherein said engineering plastic material is at least one selected from the group consisting of polyetherimide, polyarylketone, polysulfone, polyarylenesulfide, polyarylate, liquid crystal polyester, polyamide-imide, polycarbonate, and polyphenyleneoxide, and at least one p-quaterphenyl derivative selected from the group consisting of the compounds of formula I, II, and III:

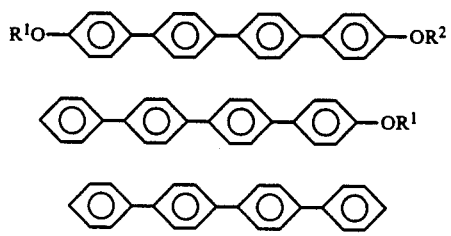

wherein $R^1$ and $R^2$, independently, are —H, —COCH₃, —CH₂CH₂OH, —CH₂CH₂OCOCH₃, —CH₂CH(CH₃)OH, —CH₂CH(CH₃)OCOCH₃, or alkyl containing from 1 to 15 carbon atoms, wherein said p-quaterphenyl derivative is present in an amount of from 0.1 to 15 parts by weight for each 100 parts by weight of said engineering plastic material.

2. A composition according to claim 1, further comprising reinforcing fibers, wherein said reinforcing fibers are present in an amount of 0.1 to 400 parts by weight of each 100 parts by weight of said engineering plastic material.

3. A composition according to claim 1, wherein said compound of formula I is at least one selected from the group consisting of 4,4'''-dihydroxy-p-quaterphenyl, 4,4'''-di(2-hydroxyethoxy)-p-quaterphenyl, 4,4'''-diacetoxy-p-quaterphenyl, 4,4'''-di(2-acetoxyethoxy)-p-quaterphenyl, 4,4'''-di(2-hydroxyisopropoxy)-p-quaterphenyl, 4,4'''-di(2-acetoxyisopropoxy)-p-quaterphenyl, 4,4'''-dimethoxy-p-quaterphenyl, 4,4'''-diethoxy-p-quaterphenyl, 4,4'''-dipropoxy-p-quaterphenyl, 4,4'''-dibutoxy-p-quaterphenyl, 4,4'''-dipentyloxy-p-quaterphenyl 4,4'''-dihexyloxy-p-quaterphenyl, 4,4'''-diheptyloxy-p-quaterphenyl, 4,4'''-dioctyloxy-p-quaterphenyl, 4,4'''-dinonyloxy-p-quaterphenyl, 4,4'''-didecyloxy-p-quaterphenyl, 4,4'''-diundecyloxy-p-quaterphenyl, 4,4'''-didodecyloxy-p-quaterphenyl, 4,4'''-ditridecyloxy-p-quaterphenyl, 4,4'''-ditetradecyloxy-p-quaterphenyl, and 4,4'''-dipentadecyloxy-p-quaterphenyl.

4. A composition according to claim 1, wherein said compound of formula II is at least one selected from the group consisting of 4-hydroxy-p-quaterphenyl, 4-(2-hydroxyethoxy)-p-quaterphenyl, 4-acetoxy-p-quaterphenyl, 4-(2-acetoxyethoxy)-p-quaterphenyl, 4-(2-hydroxyisopropoxy)-p-quaterphenyl, 4-(2-acetoxy-isopropoxy)-p-quaterphenyl, 4-methoxy-p-quaterphenyl, 4-ethoxy-p-quaterphenyl, 4-propoxy-p-quaterphenyl, 4-butoxy-p-quaterphenyl, 4-pentyloxy-p-quaterphenyl, 4-hexyloxy-p-quaterphenyl, 4-heptyloxy-p-quaterphenyl, 4-octyloxy-p-quaterphenyl, 4-nonyloxy-p-quaterphenyl, 4-decyloxy-p-quaterphenyl, 4-undecyloxy-p-quaterphenyl, 4-dodecyloxy-p-quaterphenyl, 4-tridecyloxy-p-quaterphenyl, 4-tetradecyloxy-p-quaterphenyl, and 4-pentadecyloxy-p-quaterphenyl.

5. A composition according to claim 1, wherein said p-quaterphenyl derivative is present in an amount of from 0.5 to 12 parts by weight for each 100 parts by weight of said engineering plastic material.

6. A composition according to claim 5, wherein said p-quaterphenyl derivative is present in an amount of from 0.7 to 10 parts by weight for each 100 parts by weight of said engineering plastic material.

7. A composition according to claim 2, wherein said reinforcing fibers are at least one selected from the group consisting of glass fibers, carbon fibers, boron fibers, silicon carbide fibers, graphite fibers, alumina fibers, amorphous-metal fibers, silicon-titanium-carbon inorganic fibers, and aramide fibers.

8. A composition according to claim 2, wherein said reinforcing fibers are present in an amount of from 5 to 200 parts by weight for each 100 parts by weight of said engineering plastic material.

9. An article obtained from the engineering plastic composition of any one of claims 1, 2 and 4-8 by a melt-molding technique.

10. An article according to claim 9, wherein said melt molding technique is at least one selected from the group consisting of compression molding, extrusion molding, injection molding, and blow molding.

* * * * *

UNITED STATES PATENT AND TRADEMARK OFFICE
CERTIFICATE OF CORRECTION

PATENT NO. : 5,011,879

DATED : April 30, 1991

INVENTOR(S) : Toshio Uesaka et al

It is certified that error appears in the above-identified patent and that said Letters Patent is hereby corrected as shown below:

Column 42, line 62, "1, 2 and 4-8" should read -- 1 to 8 --.

Signed and Sealed this

Twentieth Day of April, 1993

Attest:

MICHAEL K. KIRK

Attesting Officer

Acting Commissioner of Patents and Trademarks